(12) United States Patent
Zhang et al.

(10) Patent No.: US 10,411,846 B1
(45) Date of Patent: *Sep. 10, 2019

(54) MULTI-RADIO DEVICE FOR WLAN

(71) Applicant: Marvell International Ltd., Hamilton (BM)

(72) Inventors: Hongyuan Zhang, Fremont, CA (US); Hui-Ling Lou, Sunnyvale, CA (US); Rohit U. Nabar, Sunnyvale, CA (US)

(73) Assignee: MARVELL INTERNATIONAL LTD., Hamilton (BM)

( * ) Notice: Subject to any disclaimer, the term of this patent is extended or adjusted under 35 U.S.C. 154(b) by 160 days.

This patent is subject to a terminal disclaimer.

(21) Appl. No.: 14/981,603

(22) Filed: Dec. 28, 2015

Related U.S. Application Data

(63) Continuation of application No. 13/948,994, filed on Jul. 23, 2013, now Pat. No. 9,226,270, which is a
(Continued)

(51) Int. Cl.
*H04J 11/00* (2006.01)
*H04L 5/00* (2006.01)
(Continued)

(52) U.S. Cl.
CPC .......... *H04L 5/001* (2013.01); *H04L 27/2602* (2013.01); *H04W 72/04* (2013.01); *H04W 84/12* (2013.01)

(58) Field of Classification Search
USPC ....... 370/203, 204, 207, 210, 211, 464, 473, 370/479, 480, 535, 536, 539, 542, 208,
(Continued)

(56) References Cited

U.S. PATENT DOCUMENTS 6,845,090 B1  1/2005  Takabatake
7,545,832 B2  6/2009  Ito
(Continued)

OTHER PUBLICATIONS

Office Action, U.S. Appl. No. 14/325,254, dated Dec. 1, 2016, 16 pages.
(Continued)

*Primary Examiner* — Kwang B Yao
*Assistant Examiner* — Nguyen Ngo

(57) ABSTRACT

The present disclosure includes systems and techniques relating to wireless local area network devices. A described technique include accessing a data stream intended for transmission to a single wireless communication device; multiplexing the data stream to two or more radio pathways to produce a data packet; generating, via the two or more radio pathways, two or more different portions of the data packet based on an aggregated capacity of two or more wireless channels that are associated with the two or more radio pathways, the two or more radio pathways being respectively configured to use two or more groups of orthogonal frequency division multiplexing (OFDM) subcarriers to generate the two or more different portions of the data packet; and transmitting the data packet to the single wireless communication device by concurrent transmissions of the two or more different portions via the two or more wireless channels.

20 Claims, 22 Drawing Sheets

Related U.S. Application Data continuation-in-part of application No. 12/731,007, filed on Mar. 24, 2010, now Pat. No. 8,773,969.

(60) Provisional application No. 61/674,709, filed on Jul. 23, 2012, provisional application No. 61/184,943, filed on Jun. 8, 2009, provisional application No. 61/162,790, filed on Mar. 24, 2009.

(51) Int. Cl.
*H04W 72/04* (2009.01)
*H04L 27/26* (2006.01)
*H04W 84/12* (2009.01)

(58) Field of Classification Search
USPC .......................................... 370/343
See application file for complete search history.

(56) References Cited

U.S. PATENT DOCUMENTS

| | | | | |
|---|---|---|---|---|
| 7,881,398 | B2* | 2/2011 | Mujtaba | H04L 27/2628 370/206 |
| 7,949,067 | B2* | 5/2011 | Ghosh | H04L 1/0071 370/203 |
| 7,953,115 | B2 | 5/2011 | Nataga | |
| 7,991,090 | B2* | 8/2011 | Kim | H04B 7/0426 370/338 |
| 8,139,659 | B2 | 3/2012 | Aldana | |
| 8,526,529 | B2* | 9/2013 | Ahn | H04L 5/0037 370/210 |
| 8,599,900 | B2* | 12/2013 | Zhang | H04J 13/102 370/252 |
| 8,773,969 | B1* | 7/2014 | Zhang | H04L 27/2602 370/208 |
| 8,929,472 | B1* | 1/2015 | Lee | H04B 7/0885 375/267 |
| 9,226,270 | B1* | 12/2015 | Zhang | H04W 72/04 |
| 2004/0081131 | A1 | 4/2004 | Walton et al. | |
| 2005/0136933 | A1* | 6/2005 | Sandhu | H04L 1/0072 455/450 |
| 2005/0281292 | A1 | 12/2005 | Troulis et al. | |
| 2006/0007908 | A1* | 1/2006 | Hosur | H04B 7/0678 370/350 |
| 2006/0139201 | A1* | 6/2006 | Nagata | H04W 28/06 342/1 |
| 2006/0189352 | A1 | 8/2006 | Nagai et al. | |
| 2006/0193340 | A1* | 8/2006 | Jones | H04L 7/041 370/465 |
| 2007/0140377 | A1* | 6/2007 | Murakami | H04B 7/0413 375/299 |
| 2008/0025268 | A1* | 1/2008 | Honary | H04B 7/0417 370/338 |
| 2008/0049709 | A1* | 2/2008 | Pan | H04B 7/0634 370/344 |
| 2008/0130534 | A1 | 6/2008 | Tomioka | |
| 2008/0192719 | A1 | 8/2008 | So et al. | |
| 2008/0205540 | A1 | 8/2008 | Takeda et al. | |
| 2008/0248753 | A1* | 10/2008 | Chang | H04B 7/0417 455/63.1 |
| 2009/0074088 | A1* | 3/2009 | Tao | H04L 1/0007 375/260 |
| 2009/0168650 | A1 | 7/2009 | Kesselman | |
| 2009/0232124 | A1 | 9/2009 | Cordeiro | |
| 2010/0138715 | A1* | 6/2010 | Motoyoshi | H04B 7/043 714/749 |
| 2010/0208834 | A1 | 8/2010 | Van | |
| 2011/0205994 | A1* | 8/2011 | Han | H04L 1/0668 370/329 |
| 2014/0301357 | A1* | 10/2014 | Kim | H04L 5/0007 370/330 |

OTHER PUBLICATIONS

"Part 11: Wireless LAN Medium Access Control (MAC) and Physical Layer (PHY) specifications: Higher-Speed Physical Layer Extension in the 2.4 GHz Band", IEEE Std 802.11a, 1999, 91 pages.
"Part II: Wireless LAN Medium Access Control (MAC) and Physical Layer (PHY) specifications: Higher-Speed Physical Layer Extension in the 2.4 GHz Band", IEEE Std. 802.11b, 1999, 96 pages.
Information technology—Telecommunications and information exchange between systems—Local and metropolitan networks—specific requirements. Part 11: Wireless LAN Medium Access Control (MAC) and Physical Layer (PHY) Specifications, IEEE Std. 802.11n, Oct. 29, 2009, 536 pages.
"TGn Sync Proposal Technical Specification", IEEE Std. 802.11n, 2005, 131 pages.
"Information technology—Telecommunications and information exchange between systems—Local and metropolitan area networks—Specific requirements—Part 11: Wireless LAN Medium Access Control (MAC) and Physical Layer (PHY) specifications", IEEE Std 802.11, 1999, 531 pages.
"DRAFT Supplement to STANDARD [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band", IEEE 802.11g, 2003, 69 pages.
Office Action in U.S. Appl. No. 13/948,994, dated Mar. 6, 2015, 16 pages.

* cited by examiner

MULTI-RADIO DEVICE FOR WLAN

CROSS REFERENCE TO RELATED APPLICATIONS

This disclosure is a continuation and claims the benefit of the priority of U.S. application Ser. No. 13/948,994, filed Jul. 23, 2013, entitled "Multi-Radio Device for WLAN," and issued as U.S. Pat. No. 9,226,270, which is a continuation-in-part of and claims the benefit of the priority of U.S. patent application Ser. No. 12/731,007, filed Mar. 24, 2010 and entitled "Multi-Radio Device for WLAN," and issued as U.S. Pat. No. 8,773,969, which claims the benefit of the priority of U.S. Provisional Application Ser. No. 61/184,943, filed Jun. 8, 2009 and entitled "Dual Radio Device for WLAN," and the benefit of the priority of U.S. Provisional Application Ser. No. 61/162,790, filed Mar. 24, 2009 and entitled "Dual Radio Device for WLAN." In addition, this disclosure claims the benefit of the priority of U.S. Provisional Application Ser. No. 61/674,709, filed Jul. 23, 2012 and entitled "Dual Radio Device for WLAN." The disclosures of the above applications are incorporated herein by reference in their entirety.

BACKGROUND

Wireless Local Area Networks (WLANs) include multiple wireless communication devices that communicate over one or more wireless channels. When operating in an infrastructure mode, a wireless communication device called an access point (AP) provides connectivity with a network such as the Internet to other wireless communication devices, e.g., client stations or access terminals (AT). Various examples of wireless communication devices include mobile phones, smart phones, wireless routers, wireless hubs. In some cases, wireless communication electronics are integrated with data processing equipment such as laptops, personal digital assistants, and computers.

Wireless communication systems such as WLANs can use one or more wireless communication technologies such as orthogonal frequency division multiplexing (OFDM). In an OFDM based wireless communication system, a data stream is split into multiple data substreams. Such data substreams are sent over different OFDM subcarriers, which can be referred to as tones or frequency tones. Some wireless communication systems use a single-in-single-out (SISO) communication approach, where each wireless communication device uses a single antenna. Other wireless communication systems use a multiple-in-multiple-out (MIMO) communication approach, where a wireless communication device uses multiple transmit antennas and multiple receive antennas. WLANs such as those defined in the Institute of Electrical and Electronics Engineers (IEEE) wireless communications standards, e.g., IEEE 802.11a or IEEE 802.11n, can use OFDM to transmit and receive signals. Moreover, WLANs, such as ones based on the IEEE 802.11n standard, can use OFDM and MIMO.

SUMMARY

The present disclosure includes systems, apparatuses, and techniques for wireless local area networks.

Systems, apparatuses, and techniques for wireless local area networks can include multiplexing information for a single wireless communication device onto multiple radio pathways to produce a data packet, operating the multiple radio pathways to generate different portions of the data packet, and transmitting the data packet to the single wireless communication device by concurrent transmissions of the different portions of the data packet over different wireless channels. The multiple radio pathways can be associated with the different wireless channels.

Systems, apparatuses, and techniques for wireless local area networks can include one or more of the following features. Transmitting the data packet to the single wireless communication device can include transmitting, in a first frequency band, a signal based on a first portion of the different portions to the wireless communication device. Transmitting the data packet to the single wireless communication device can include transmitting, in a second frequency band, a signal based on a second portion of the different portions to the wireless communication device.

Transmitting the packet to the single wireless communication device can include generating first transmit signals based on a first multiplexing matrix and a first portion of the different portions and generating second transmit signals based on a second multiplexing matrix and a second portion of the different portions. The first multiplexing matrix can be associated with a first radio unit of the wireless communication device. The second multiplexing matrix can be associated with a second radio unit of the wireless communication device. Implementations can include combining the first transmit signals and second transmit signals to produce combined transmit signals and transmitting the combined transmit signals on multiple transmit antennas, respectively.

Implementations can include generating, in a medium access control (MAC) layer, a MAC protocol data unit (MPDU) for the wireless communication device. Radio pathways can include a first radio pathway and a second radio pathway. Multiplexing the information can include providing a first segment of the MPDU to the first radio pathway and providing a second segment of the MPDU to the second radio pathway. Operating multiple radio pathways can include generating, in the first radio pathway, a first physical layer frame based on a MAC address associated with the wireless communication device and the first segment. Operating multiple radio pathways can include generating, in the second radio pathway, a second physical layer frame based on the MAC address and the second segment.

Implementations can include generating, in a MAC layer, a MAC service data unit (MSDU) for the wireless communication device. Multiplexing the information can include providing a first segment of the MSDU to the first radio pathway, and providing a second segment of the MSDU to the second radio pathway. Operating the multiple radio pathways can include generating, in the first radio pathway, a first MAC protocol data unit (MPDU) based on the first segment and a first MAC address associated with the wireless communication device. Operating the multiple radio pathways can include generating, in the second radio pathway, a second MPDU based on the second segment and a second MAC address associated with the wireless communication device.

Implementations can include generating orthogonal frequency division multiplexing (OFDM) subcarriers based on a physical layer frame for the wireless communication device. A physical layer frame can be generated based on an aggregated bandwidth of at least two wireless channels associated with the wireless communication device. Multiplexing the information can include providing a first group of the OFDM subcarriers to the first radio pathway and providing a second group of the OFDM subcarriers to the second radio pathway. Operating the multiple radio pathways can include generating, in the first radio pathway, a first transmission signal based on an inverse Fourier transformation of the first group. Operating the multiple radio pathways can include generating, in the second radio pathway, a second transmission signal based on an inverse Fourier transformation of the second group. Transmitting the packet to the single wireless communication device can include transmitting the first transmission signal in a first frequency band. Transmitting the packet to the single wireless communication device can include transmitting the second transmission signal in a second frequency band. Implementations can include generating signaling information that indicates that a data packet is a dual-radio data packet. Such signaling information can cause a wireless communication device to combine information resolved from concurrent transmissions.

In another aspect, a described apparatus includes processor electronics configured to generate a data stream intended for transmission to a single wireless communication device within a data packet, the data packet comprising two or more groups of OFDM subcarriers that are respectively assigned to two or more frequency bands; a first radio unit configured to produce a first portion of the data packet based, at least, on the data stream and a first group of the two or more groups of OFDM subcarriers; a second radio unit configured to produce a second portion of the data packet based, at least, on the data stream and a second group of the two or more groups of OFDM subcarriers; and a parser configured to multiplex the data stream onto to radio units including the first radio unit and the second radio unit.

In another aspect, a described system includes circuitry configured to access a data stream intended for transmission to a single wireless communication device; two or more radio pathways that are configured to collectively produce a data packet based, at least, on the data stream, wherein the data packet comprises two or more groups of OFDM subcarriers that are respectively assigned to two or more frequency bands, and wherein the two or more radio pathways are configured to use the two or more groups of OFDM subcarriers to generate two or more different portions of the data packet, respectively; a parser configured to multiplex the data stream onto to the two or more radio pathways; and circuitry configured to transmit, via the two or more frequency bands, the data packet to the single wireless communication device by concurrent transmissions of the two or more different portions.

These and other implementations can include one or more of the following features. In some implementations, the parser is configured to multiplex bits of the data stream onto the two or more radio pathways, and the two or more radio pathways each include a constellation mapper configured to generate constellation symbols based on respective portions of the bits of the data stream. In some implementations, the parser is configured to multiplex the bits of the data stream by alternating among the two or more radio pathways to distribute the bits such that each radio pathway obtains a different interleaved portion of the bits. In some implementations, the parser is configured to provide a first group of contiguous bits of the data stream to a first radio pathway of the two or more radio pathways; and provide a second group of contiguous bits of the data stream to a second radio pathway of the two or more radio pathways.

Implementations can include a constellation mapper configured to produce a constellation mapped version of the data stream based, at least, on the data stream, wherein the parser is configured to multiplex the constellation mapped version of the data stream onto the two or more radio pathways. In some implementations, the parser is configured to alternate among the two or more radio pathways to distribute constellation symbols of the constellation mapped version of the data stream such that each radio pathway obtains a different interleaved portion of the constellation mapped version of the data stream. In some implementations, the parser is configured to alternate among the two or more radio pathways to provide a first group of contiguous constellation symbols of the constellation mapped version of the data stream to a first radio pathway of the two or more radio pathways, and provide a second group of contiguous constellation symbols of the constellation mapped version of the data stream to a second radio pathway of the two or more radio pathways. In some implementations, the first radio pathway includes circuitry configured to perform a first inverse Fourier transformation based, at least, on the first group of contiguous constellation symbols. In some implementations, the second radio pathway includes circuitry configured to perform a second inverse Fourier transformation based, at least, on the second group of contiguous constellation symbols, where the second inverse Fourier transformation is separate from the first inverse Fourier transformation.

Implementations can include circuitry configured to interleave and encode the data stream based on a binary convolutional code to produce a convolutional version of the data stream, where the parser is configured to multiplex the convolutional version of the data stream onto the two or more radio pathways, and where the different portions of the data packet are jointly protected by the binary convolutional code. Implementations can include a constellation mapper configured to produce a constellation mapped version of the data stream based, at least, on the data stream; and a spatial mapper configured to perform spatial mapping based, at least, on the constellation mapped version of the data stream to produce a spatial version of the data stream, where the parser is configured to multiplex the spatial version of the data stream onto the two or more radio pathways.

In another aspect, a described technique includes accessing a data stream intended for transmission to a single wireless communication device, multiplexing the data stream onto two or more radio pathways to produce a data packet, operating the two or more radio pathways to respectively use two or more groups of OFDM subcarriers to generate two or more different portions of the data packet, the two or more groups of OFDM subcarriers being respectively assigned to two or more frequency bands, and transmitting the data packet to the single wireless communication device by concurrent transmissions of the two or more different portions via the two or more frequency bands.

These and other implementations can include one or more of the following features. Multiplexing the data stream can include multiplexing a stream of bits onto the two or more radio pathways. In some implementations, the radio pathways are configured to perform constellation mapping based on respective portions of the stream of bits. Multiplexing the stream of bits onto the two or more radio pathways can include alternating among the two or more radio pathways to distribute the stream of bits such that each radio pathway obtains a different interleaved portion of the stream of bits. Multiplexing the stream of bits onto the two or more radio pathways can include providing a first group of contiguous bits of the stream of bits to a first radio pathway of the two or more radio pathways, and providing a second group of contiguous bits of the stream of bits to a second radio pathway of the two or more radio pathways.

Implementations can include performing constellation mapping based, at least, on the data stream to produce a constellation mapped version of the data stream. Multiplexing the data stream can include multiplexing the constellation mapped version of the data stream onto the two or more radio pathways. Multiplexing the constellation mapped version of the data stream onto the two or more radio pathways can include alternating among the two or more radio pathways to distribute constellation symbols of the constellation mapped version of the data stream such that each radio pathway obtains a different interleaved portion of the constellation mapped version of the data stream. Multiplexing the constellation mapped version of the data stream onto the two or more radio pathways can include providing a first group of contiguous constellation symbols of the constellation mapped version of the data stream to a first radio pathway of the two or more radio pathways, and providing a second group of contiguous constellation symbols of the constellation mapped version of the data stream to a second radio pathway of the two or more radio pathways. Implementations can include performing constellation mapping based, at least, on the data stream to produce a constellation mapped version of the data stream, and performing spatial mapping based, at least, on the constellation mapped version of the data stream to produce a spatial version of the data stream. Multiplexing the data stream can include multiplexing the spatial version of the data stream onto the two or more radio pathways. Implementations can include interleaving and encoding the data stream based on a binary convolutional code to produce a convolutional version of the data stream. Multiplexing the data stream can include multiplexing the convolutional version of the data stream onto the two or more radio pathways, and wherein the different portions of the data packet are jointly protected by the binary convolutional code.

Details of one or more implementations are set forth in the accompanying drawings and the description below. Other features and advantages may be apparent from the description and drawings, and from the claims.

DRAWING DESCRIPTIONS

Like reference symbols in the various drawings indicate like elements.

DETAILED DESCRIPTION

Figure 1A:
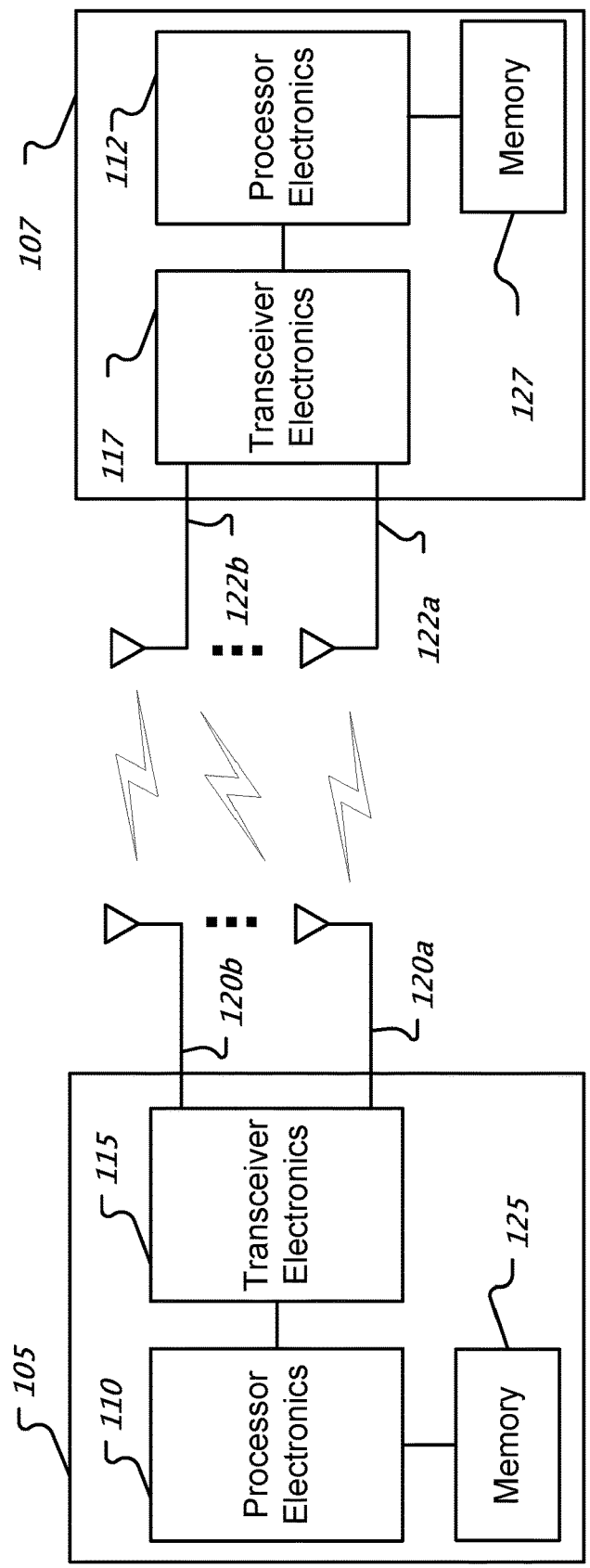
FIG. 1A shows an example of a wireless local area network with two wireless communication devices.

FIG. 1A shows an example of a wireless local area network with two wireless communication devices. Wireless communication devices 105, 107 such as an access point (AP), base station (BS), access terminal (AT), client station, or mobile station (MS) can include processor electronics 110, 112 such as one or more processors that implement methods effecting the techniques presented in this disclosure. Wireless communication devices 105, 107 include transceiver electronics 115, 117 to send and/or receive wireless signals over one or more antennas 120a, 120b, 122a, 122b. In some implementations, transceiver electronics 115, 117 include multiple radio units. In some implementations, a radio unit includes a baseband unit (BBU) and a radio frequency unit (RFU) to transmit and receive signals. Wireless communication devices 105, 107 include one or more memories 125, 127 configured to store information such as data and/or instructions. In some implementations, wireless communication devices 105, 107 include dedicated circuitry for transmitting and dedicated circuitry for receiving.

A first wireless communication device 105 can transmit data over multiple wireless channels to a second wireless communication device 107. In some implementations, the first wireless communication device 105 implements a frequency division technique to transmit data to the second wireless communication device 107 using two or more wireless channels operated at different frequency bands. In some implementations, the first wireless communication device 105 implements a space division technique to transmit data to the second wireless communication device 107 using two or more multiplexing matrices to provide spatial separated wireless channels in a single frequency band. Note that a frequency band can be referred to as a frequency segment.

Wireless communication devices 105, 107 in a WLAN can use one or more protocols for medium access control (MAC) and Physical (PHY) layers. For example, a wireless communication device can use a Carrier Sense Multiple Access (CSMA) with Collision Avoidance (CA) based protocol for a MAC layer and OFDM for the PHY layer. A MIMO-based wireless communication device can transmit and receive multiple spatial streams over multiple antennas in each of the tones of an OFDM signal.

The wireless communication devices 105, 107 are sometimes referred to as transmitters and receivers for convenience. For example, a "transmitter" as used herein refers to a wireless communication device that receives and transmits signals. Likewise, a "receiver" as used herein refers to a wireless communication device that receives and transmits signals.

A MIMO enabled AP can transmit signals for multiple client wireless communication devices at the same time in the same frequency band by applying one or more transmitter side beam forming matrices to spatially separate signals associated with different client wireless communication devices. Based on different interference patterns at the different antennas of the wireless communication devices, each client wireless communication device can discern its own signal. A MIMO enabled AP can participate in sounding to obtain channel state information for each of the client wireless communication devices. The AP can compute a spatial steering matrix based on the channel state information to spatially separate signals to different client wireless communication devices.

This disclosure provides details and examples of multi-radio data packet techniques and systems. A multi-radio data packet can include multiple physical layer frames for a single wireless communication device. Multi-radio data packet techniques and systems can increase single-user throughput in a WLAN. For example, a wireless communication device can include two radio units to double the communication bandwidth.

Figure 1B:
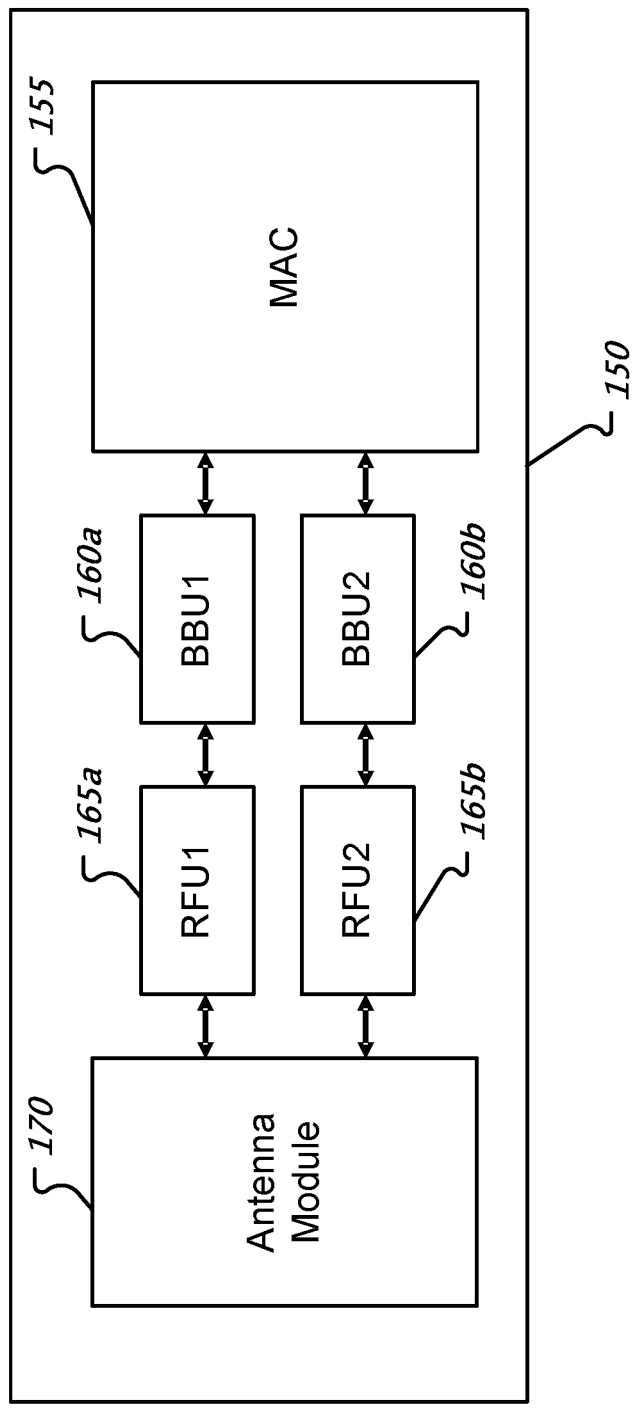
FIG. 1B shows an example of a dual-radio wireless communication device architecture.

FIG. 1B shows an example of a dual-radio wireless communication device architecture. A dual-radio wireless communication device 150 includes a MAC module 155. The MAC module 155 can include one or more MAC control units (MCUs) (not shown). The dual-radio wireless communication device 150 includes two or more BBUs 160a, 160b that are respectively coupled with two or more RFUs 165a, 165b. In some implementations, a dual-radio wireless communication device 150 can include a first RFU 165a and a first BBU 160a in a first radio pathway and a second RFU 165b and a second BBU 160b in a second radio pathway. In a transmitting process, the MAC module 155 can multiplex data between the first and second radio pathways. In a receiving process, the MAC module 155 can de-multiplex data from the first and second radio pathways.

The RFUs 165a, 165b are communicatively coupled with an antenna module 170. An antenna module 170 can include multiple transmit and receive antennas. In some implementations, the antenna module 170 is a detachable unit that is external to the wireless communication device 150. In some implementations, the RFUs 165a, 165b are communicatively coupled with separate antenna modules situated in different spatial locations.

The dual-radio wireless communication device 150 can operate using one or more communication modes such as a frequency division (FD) mode or a space division (SD) mode. In a frequency division mode, the BBUs 160a, 160b and RFUs 165a, 165b can operate in parallel at two different frequency bands such as frequency bands employed by IEEE 802.11n or IEEE 802.11a based communication systems. Such frequency bands can be either contiguous with each other or non-contiguous. In a space division mode, the BBUs 160a, 160b and RFUs 165a, 165b can operate in a single frequency band at two orthogonal spatial subspaces, e.g., two orthogonal Space Division Multiple Access (SDMA) subspaces.

In some implementations, the dual-radio wireless communication device 150 includes one or more integrated circuits (ICs). In some implementations, the MAC module 155 includes one or more ICs. In some implementations, the dual-radio wireless communication device 150 includes an IC that implements the functionality of multiple units and/or modules such as a MAC module, MCU, BBU, or RFU. In some implementations, the dual-radio wireless communication device 150 includes a host processor that provides a data stream to the MAC module 155 for transmission. In some implementations, the dual-radio wireless communication device 150 includes a host processor that receives a data stream from the MAC module 155. In some implementations, the host processor includes the MAC module 155.

Figure 2:
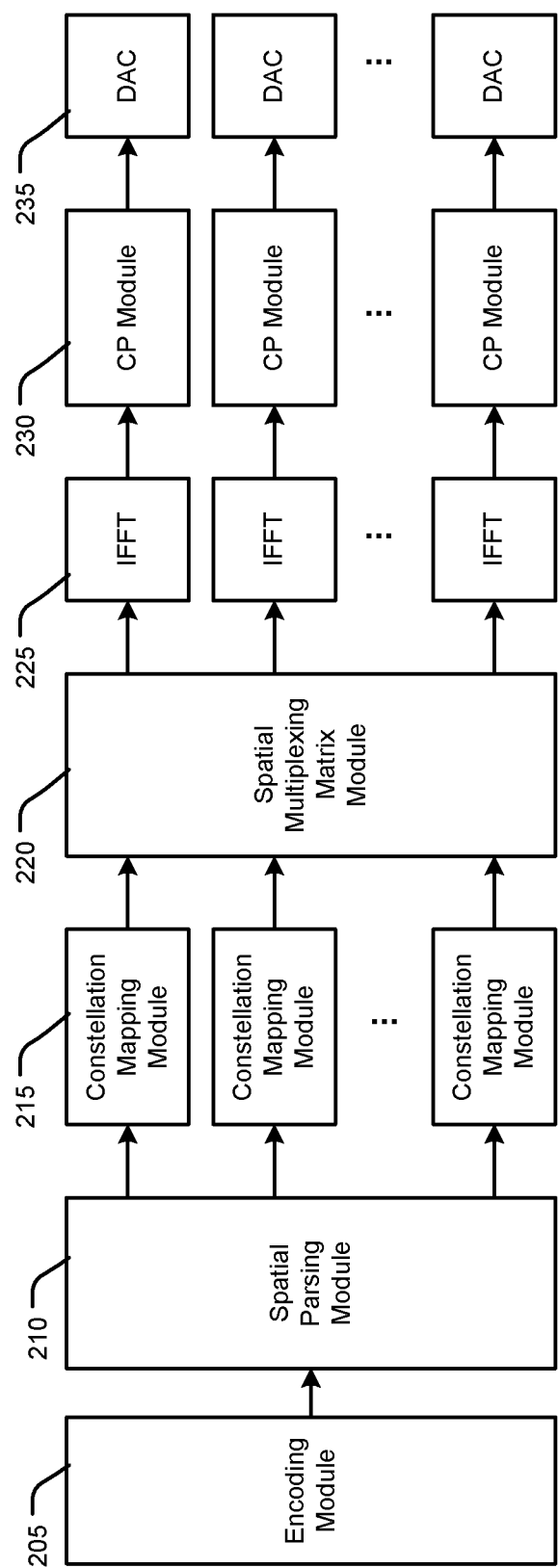
FIG. 2 shows an example of a functional block diagram of a transmit path of wireless communication device.

FIG. 2 shows an example of a functional block diagram of a transmit path of wireless communication device. In this example, a transmit path is configured for MIMO communications. A wireless communication device can include one or more transmit paths. A transmit path can include an encoding module 205 configured to receive a data steam, such as an audio data stream, a video data stream, or combination thereof. The encoding module 205 outputs encoded bit streams to a spatial parsing module 210, which performs spatial mapping to produce multiple outputs.

Outputs of the spatial parsing module 210 are input into constellation mapping modules 215, respectively. In some implementations, a constellation mapping module 215 includes a serial-to-parallel converter that converts an incoming serial stream to multiple parallel streams. The constellation mapping module 215 can perform quadrature amplitude modulation (QAM) on multiple streams produced by a serial-to-parallel conversion. The constellation mapping module 215 can output OFDM tones that are input to a spatial multiplexing matrix module 220. The spatial multiplexing matrix module 220 can multiply the OFDM tones by a spatial multiplexing matrix to produce signal data for multiple transmit antennas.

Outputs of the spatial multiplexing matrix module 220 are input to Inverse Fast Fourier Transform (IFFT) modules 225. Outputs of the IFFT modules 225 are input to cyclic prefix (CP) modules 230. Outputs of the CP modules 230 are input to digital-to-analog converters (DACs) 235, which produce analog signals for transmission on multiple transmit antennas, respectively.

Figure 3:
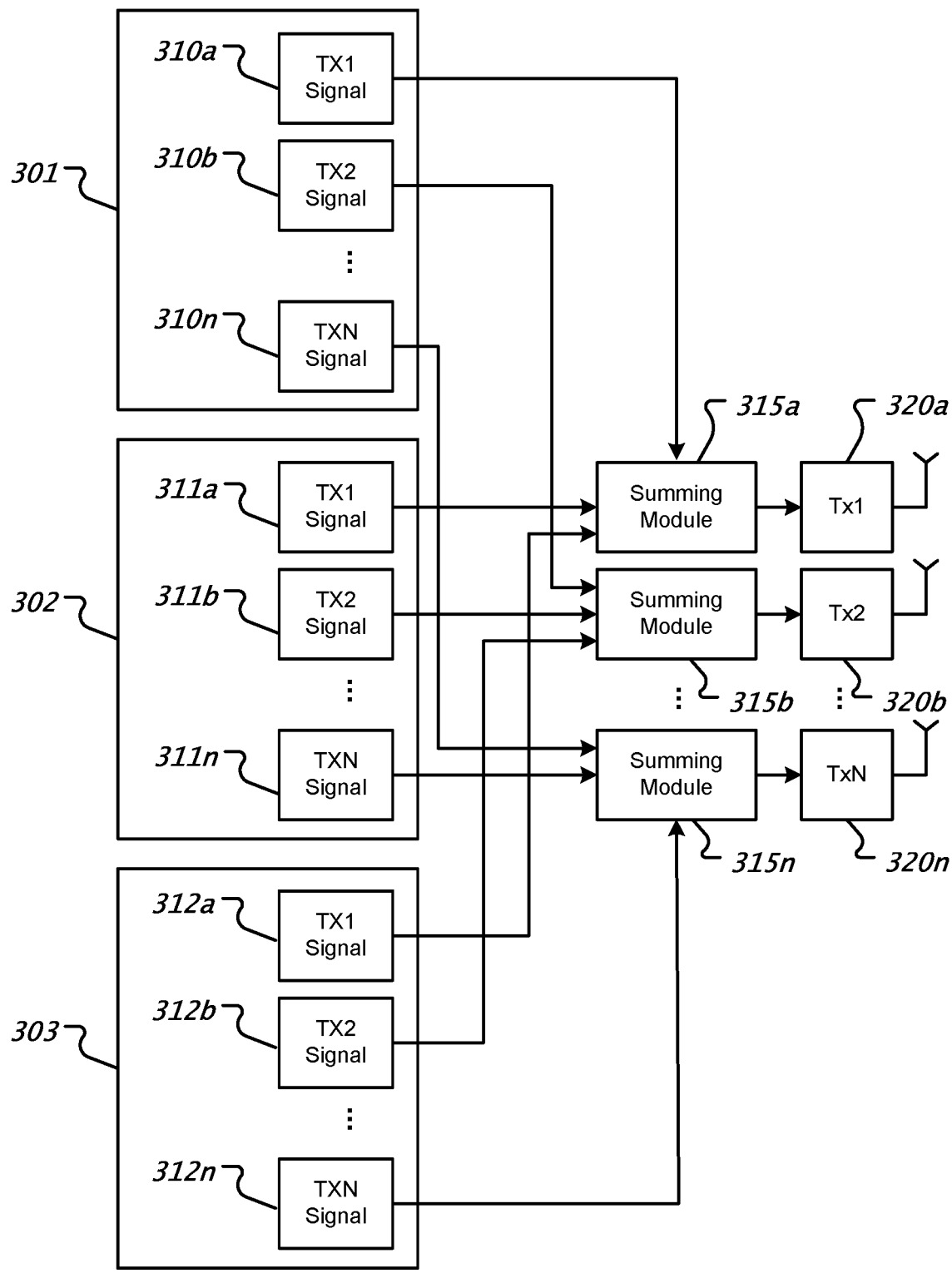
FIG. 3 shows an example of an architecture that combines multiple transmission signals for transmission on multiple antennas.

FIG. 3 shows an example of an architecture that combines multiple transmission signals for transmission on multiple antennas. A transmitter can include two or more transmit paths 301, 302, 303 that are each configured for MIMO communications. A first transmit path 301 generates multiple transmit signals 310a, 310b, 310n for transmission on multiple transmit antennas 320a, 320b, 320n, respectively. A second transmit path 302 generates multiple transmit signals 311a, 311b, 311n for transmission on multiple transmit antennas 320a, 320b, 320n, respectively. A third transmit path 303 generates multiple transmit signals 312a, 312b, 312n, for transmission on multiple transmit antennas 320a, 320b, 320n, respectively.

A transmitter can include multiple summing modules 315a, 315b, 315n that are associated with multiple transmit antennas 320a, 320b, 320n, respectively. In some implementations, summing modules 315a, 315b, 315n sum corresponding outputs of DACs in each of the transmit paths 301, 302, 303 to produce combined transmit signals for each of antennas 320a, 320b, 320n.

Figure 4A:
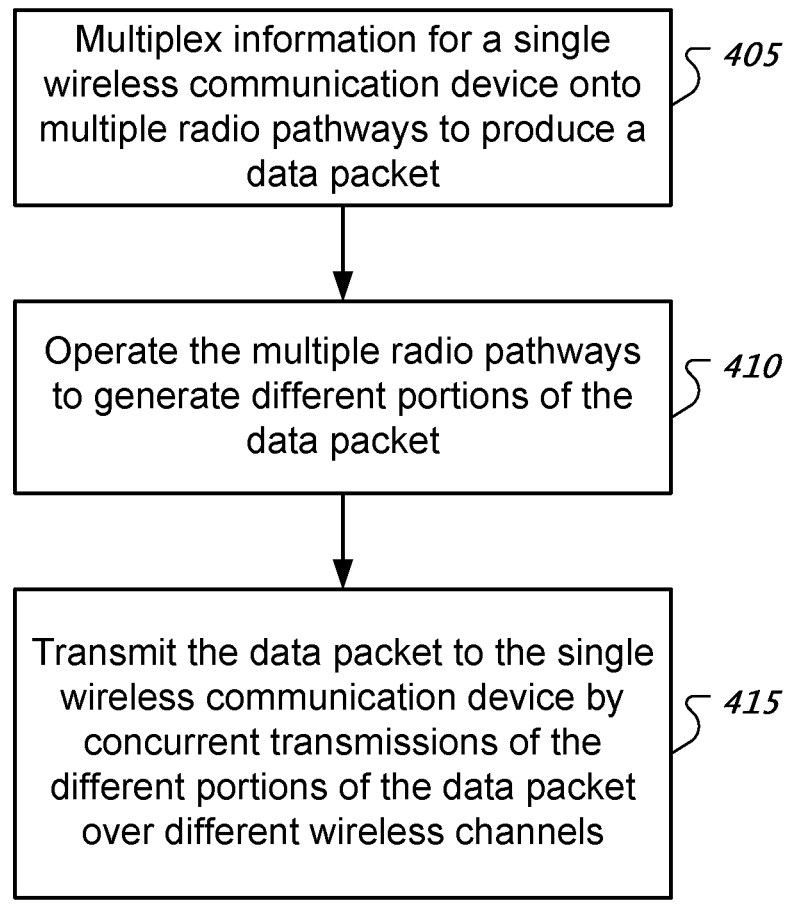
FIG. 4A shows an example of a multi-radio data packet process.

FIG. 4A shows an example of a multi-radio data packet process. At 405, a multi-radio data packet process can include multiplexing information for a single wireless communication device onto multiple radio pathways to produce a data packet such as a multi-radio data packet. For example, information such as a data stream, physical layer frame, or a data unit is multiplexed on to first and second radio pathways. At 410, the multi-radio data packet process can include operating the multiple radio pathways to generate different portions of the data packet.

At 415, the multi-radio data packet process can include transmitting the data packet to the single wireless communication device by concurrent transmissions of the different portions of the data packet over different wireless channels. In some implementations, the data packet such as a dual-radio data packet can include two physical layer frames. In some implementations, an access point can operate two radio units to start a concurrent transmission of two different portions of the data packet. For example, a first radio unit of a AP transmits a first physical layer frame of the data packet to the wireless communication device at or about the same time a second radio unit of the AP transmits a second physical layer frame of the data packet to the wireless communication device. The wireless communication device can operate multiple radio pathways and a de-multiplexer to recover the information multiplexed at 405.

Figure 4B:
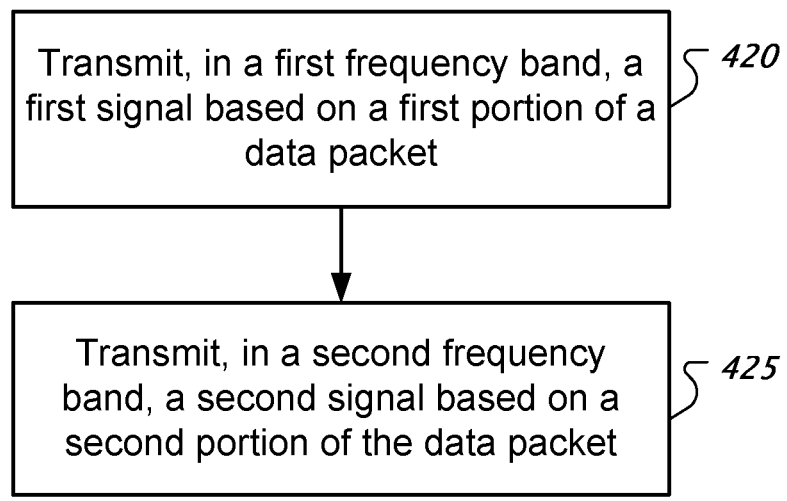
FIG. 4B shows an example of a frequency division transmitting process.

FIG. 4B shows an example of a frequency division transmitting process. Wireless channels can correspond to different frequency bands. Thus, transmitting a data packet to a single wireless communication device can include operating two or more radio units at different frequency bands to concurrently transmit signals. At 420, a frequency division transmitting process includes transmitting, in a first frequency band, a first signal based on a first portion of a data packet. At 425, the transmitting process includes transmitting, in a second frequency band, a second signal based on a second portion of the data packet.

A frequency division based receiver, which includes two radio units in two radio pathways, can receive the first signal via a first radio unit and the second signal via a second radio unit. For example, the receiver can operate the radio pathways and a de-multiplexer to recover information multiplexed at 405.

Figure 4C:
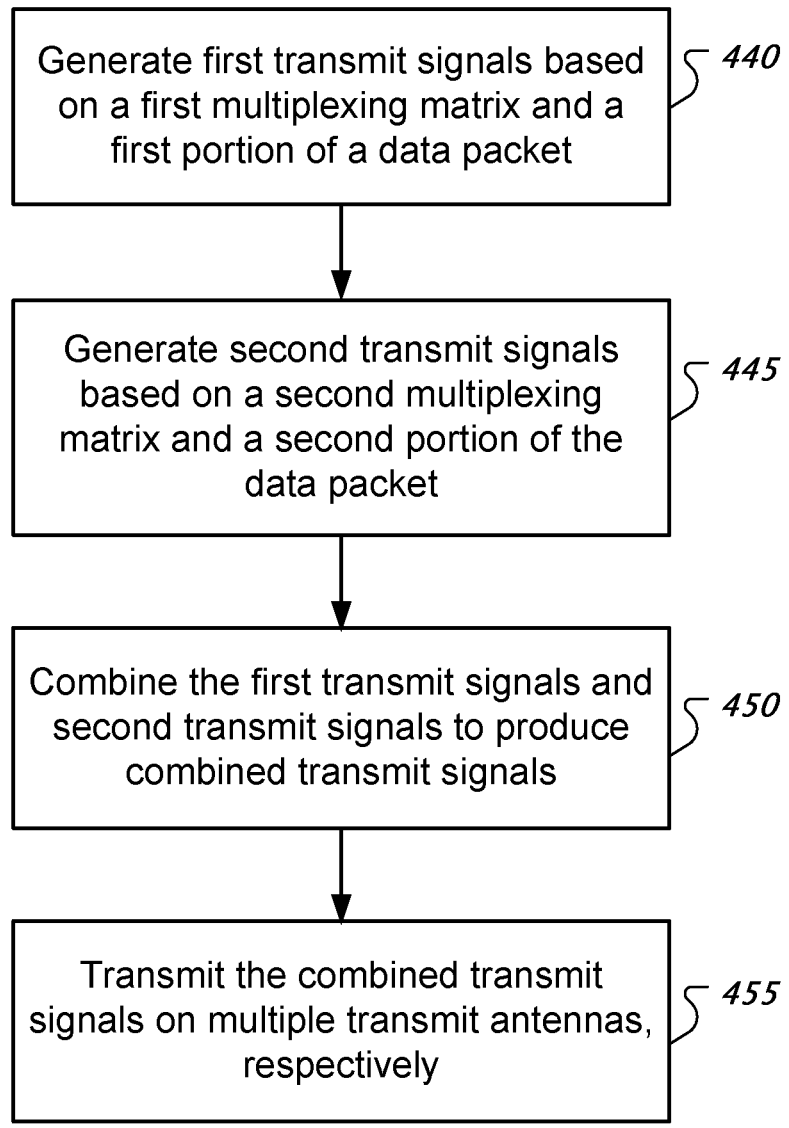
FIG. 4C shows an example of a space division transmitting process.

FIG. 4C shows an example of a space division transmitting process. Wireless channels can correspond to different spatial channels. Thus, transmitting a data packet to a single wireless communication device can include using two or more spatial wireless channels. At 440, a space division transmitting process includes generating first transmit signals based on a first multiplexing matrix and a first portion of a data packet. At 445, the transmitting process includes generating second transmit signals based on a second multiplexing matrix and a second portion of the data packet. The first and second multiplexing matrices can be associated with first and second radio units of the wireless communication device. At 450, the space division transmitting process includes combining the first transmit signals and second transmit signals to produce combined transmit signals. At 455, the transmitting process includes transmitting the combined transmit signals on multiple transmit antennas, respectively.

A space division based receiver, which includes two radio units in two radio pathways, can receive the first signal via a first radio unit and the second signal via a second radio unit. The first and second radio units in the receiver can be associated with spatially separated antenna arrays. The receiver can operate the radio pathways and a de-multiplexer to recover the information multiplexed at 405.

Figure 5:
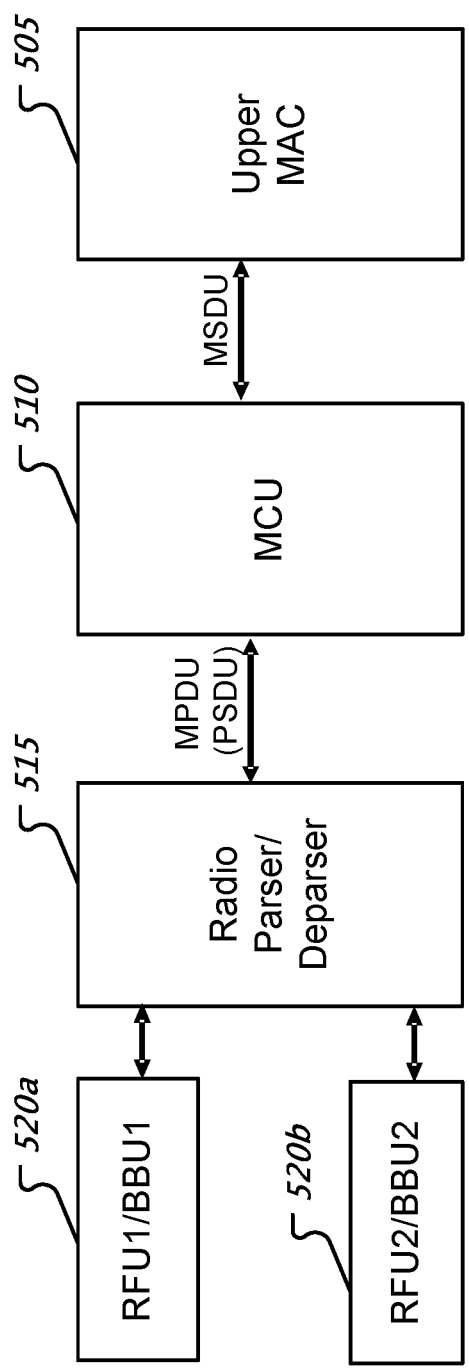
FIG. 5 shows an example of a data multiplexing architecture.

FIG. 5 shows an example of a data multiplexing architecture. A wireless communication device can use one or more data multiplexing techniques to split data across multiple radio pathways. In this example, a wireless communication device includes a single MCU 510 that is configured to generate data units based on information generated by an upper MAC module 505. In some implementations, a MAC module includes the upper MAC module 505. The upper MAC module 505 can generate a MAC Service Data Unit (MSDU) based on data received from higher level protocols such Transmission Control Protocol over Internet Protocol (TCP/IP). A MCU 510 can generate a MAC Protocol Data Unit (MPDU) based on a MSDU. In some implementations, a MCU 510 can output a Physical Layer Service Data Unit (PSDU) based on a MPDU. For example, a wireless communication device can generate a data unit, e.g., a MPDU or a PSDU, that is intended for a single wireless communication device recipient.

The wireless communication device can multiplex a single data unit on two or more radio units for transmission. In some implementations, the wireless communication device can use a multiplexer such as a parser in a parser/deparser module 515 to multiplex information such as a data unit. In some implementations, a wireless communication device can provide a first segment of a MPDU to a first radio pathway and a second segment of the MPDU to a second radio pathway. For example, the wireless communication device can use a radio parser/deparser module 515 to parse a data unit on to two or more radio units 520*a*, 520*b* e.g., RFU1/BBU1 and RFU2/BBU2, in two or more radio pathways for transmission. For receiving, the wireless communication device can use a radio parser/deparser module 515 to de-parse a dual-radio data packet.

A wireless communication device can use one or more parsing techniques. For example, a wireless communication device can parse a data unit equally between two radio units 520*a*, 520*b*. In another example, a wireless communication device can parse a data unit unequally, e.g., one radio unit may have more bandwidth than another radio unit. In yet another example, a radio unit experiencing greater interference can be used to transmit least-significant bit portions of a data unit.

A wireless communication device can generate, in different radio pathways, different physical layer frames based on different segments of a data unit. For example, a multi-radio data packet such as a dual-radio data packet can include a single MPDU split into two or more Physical Layer Protocol Data Units (PPDUs), which can be transmitted via two or more radio units. In some implementations, a dual-radio packet can include a single MAC address in a MAC header portion. In some implementations, only one of the PPDUs in a dual-radio data packet is required to include a MAC header. At a receiver, PPDUs in the dual-radio data packet are received and de-parsed to form a single MPDU, which can be provided to a single MCU for upstream processing.

Figure 6:
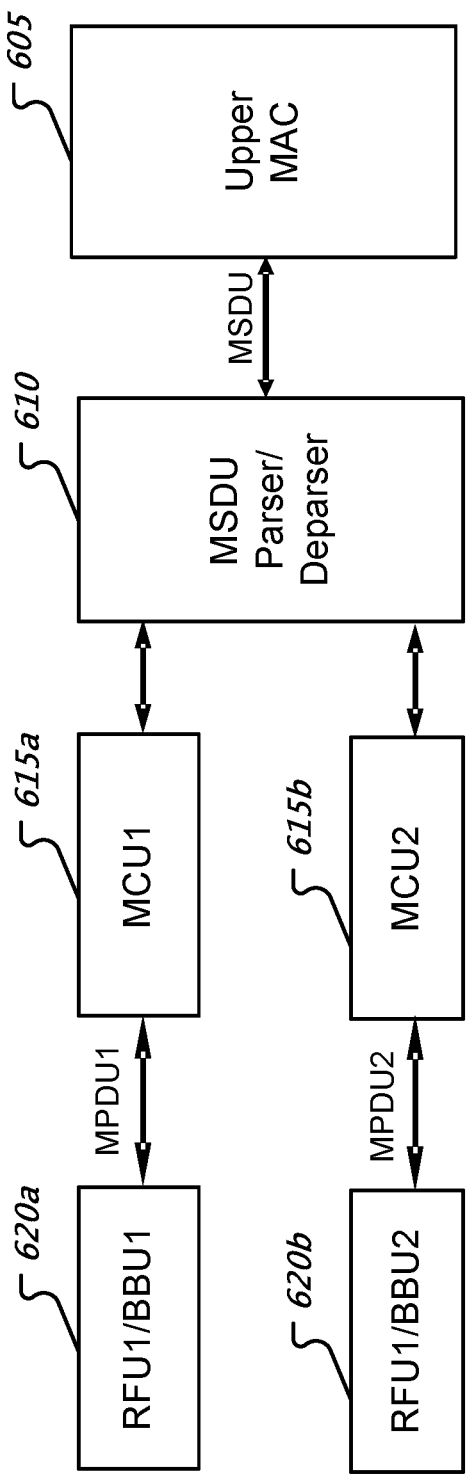
FIG. 6 shows an example of a dual medium access controller data multiplexing architecture.

FIG. 6 shows an example of a dual medium access controller data multiplexing architecture. A wireless communication device can include two or more MCUs 615*a*, 615*b* to generate a multi-radio packet that includes two or more MPDUs. A wireless communication device can include an upper MAC module 605 to generate a MSDU. The wireless communication device can multiplex a data unit such as a MSDU on two or more radio pathways. For example, the wireless communication device can provide different segments of the MSDU to different radio pathways, respectively.

In some implementations, a MSDU parser/deparser module 610 can parse a MSDU on to two or more radio pathways. A radio pathway can include a MCU 615*a*, 615*b* and a radio unit 620a, 620b. Each radio pathway can generate a MPDU based on a portion of the MSDU. In this example, the MCUs 615a, 615b in the radio pathways generate different MPDUs based on their respective portions of the MSDU. The radio units 620a, 620b in the radio pathways transmit the dual-radio packet via concurrently transmitting their respective MPDUs.

In some implementations, a dual-radio packet includes two MPDUs encapsulated in two PPDUs, which can be transmitted via two radio units. Such a dual-radio packet includes two MAC headers in the respective two PPDUs. In some implementations, the same MAC address is used for both MAC headers. In some implementations, different MAC addresses are used in the MAC headers. At a receiver, the two PPDUs and corresponding MPDUs can be received separately and then de-parsed to form a MSDU.

Figure 7:
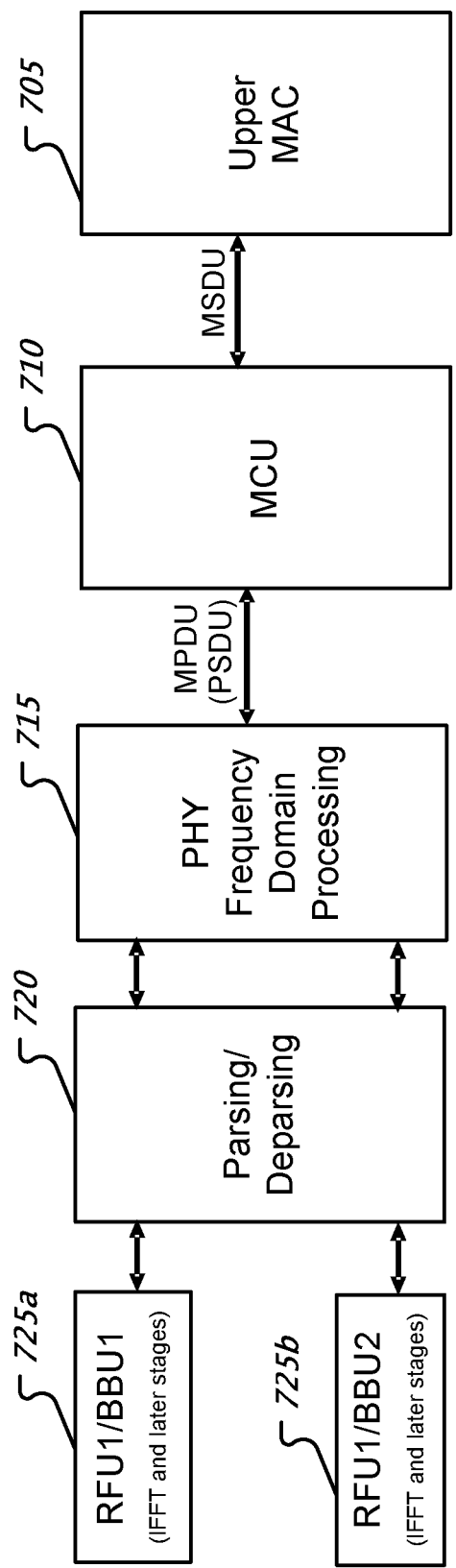
FIG. 7 shows an example of a physical layer data multiplexing architecture.

FIG. 7 shows an example of a physical layer data multiplexing architecture. A wireless communication device can perform data multiplexing at a physical layer. In some implementations, a wireless communication device can generate a physical layer frame based on an aggregated bandwidth of two or more wireless channels associated with the wireless communication device. For example, a wireless communication device can generate OFDM subcarriers based on a physical layer data packet addressed to a single wireless communication device using an aggregated capacity of two or more radio units of the single wireless communication device. A wireless communication device can multiplex OFDM subcarriers on to two or more radio pathways. For example, a wireless communication device can provide a group of the OFDM subcarriers to a first radio pathway, and provide the remaining OFDM subcarriers in a different group to a second radio pathway.

A wireless communication device can include an upper MAC module 705 to generate a MSDU based on an aggregated capacity of two or more wireless channels. The wireless communication device can generate a data unit, e.g., a MPDU or a PSDU, that is intended for a single receiver. A MCU 710 can generate a MPDU based on a MSDU. In some implementations, a MCU 710 can output PSDU based on a MPDU.

A PHY frequency domain processing module 715 is coupled with the MCU 710. For transmitting, the PHY frequency domain processing module 715 can perform operations such as scrambling, encoding, spatial parsing, interleaving, modulation, and spatial multiplexing. For receiving, the PHY frequency domain processing module 715 can perform operations such as descrambling, decoding, spatial de-parsing, de-interleaving, and demodulation.

The PHY frequency domain processing module 715 can generate an output having a bandwidth proportional to the number of wireless channels operated by the receiver. For example, the wireless communication device can include two or more radio units 725a, 725b configured to handle 40 MHz signals. In this case, the PHY frequency domain processing module 715 can generate an output having a bandwidth of 80 MHz. The PHY frequency domain processing module 715 can generate OFDM symbols based on a bandwidth of 80 MHz.

The wireless communication device can multiplex the OFDM subcarriers in to two or more radio pathways. A parsing/de-parsing module 720 can parse the OFDM subcarriers in to two or more groups of OFDM subcarriers, which are then provided to two or more radio pathways, respectively. Each radio pathway performs an IFFT on a respective group of OFDM subcarriers via an IFFT module in a respective radio unit 725a, 725b. The two or more IFFT output signals, e.g., time domain signals, are transmitted with via respective RFUs in the radio units 725a, 725b. PHY preambles can be generated for the two or more radio units separately—no parsing is required for PHY preambles.

In some implementations, a radio device can transmit and receive on two or more wireless channels that are on two different portions of an 80 MHz band. For example, two 20 MHz non-adjacent band signals can be transmitted by a single 80 MHz BBU/RFU by inserting zero-tones in the frequency domain for the frequency bands that are not allocated for the two 20 MHz signals. In some implementations, two 20 MHz zero-tones signals are inserted between the two 20 MHz non-adjacent band signals. A radio device can select one or more zero-tone regions in an 80 MHz band to avoid interference with other signals such as 5 GHz Dynamic Frequency Selection (DFS) channels or radar pulses. A receiver can use a single 80 MHz RFU/BBU to retrieve the two transmitted 20 MHz non-adjacent band signals. In some implementations, a radio device can transmit and receive over two different portions of a 160 MHz band, e.g. 40 MHz/40 MHz, 40 MHz/80 MHz, or 80 MHz/80 MHz. When applied in a wireless communication system such as Wi-Fi, the two frequency bands in a dual-radio device can be contiguous or non-contiguous with each other with an overall bandwidth of 40 MHz, 80 MHz, 120 MHz, or 160 MHz, within the whole allowable bands. For example, possible combinations include 20/20, 20/40, 40/40, 40/80, and 80/80.

A wireless communication device can use two or more wireless channels provided by a SDMA technique to transmit data to another wireless communication device. For example, a dual-radio device can operate two radio units in the same frequency band, but separate the signals transmitted via the two radio units by SDMA. A transmitter can sound wireless channels for a SDMA-based dual-radio receiver. The transmitter can spatially steer signals for different radio units of a dual-radio receiver. In some implementations, instead of operating two SDMA channels for two different user devices, the two SDMA channels can be operated to transmit data to one user device.

A multi-radio data packet can include packet content transmitted via two or more SDMA-based wireless channels. At a receiver, content from two or more SDMA-based wireless channels can be combined to form a single data stream. For example, a dual-radio receiver can receive two PPDUs, included in a dual-radio packet, that are received by separate radio units in the receiver. The receiver can combine the content derived from the PPDUs to generate a larger data unit.

Figure 8:
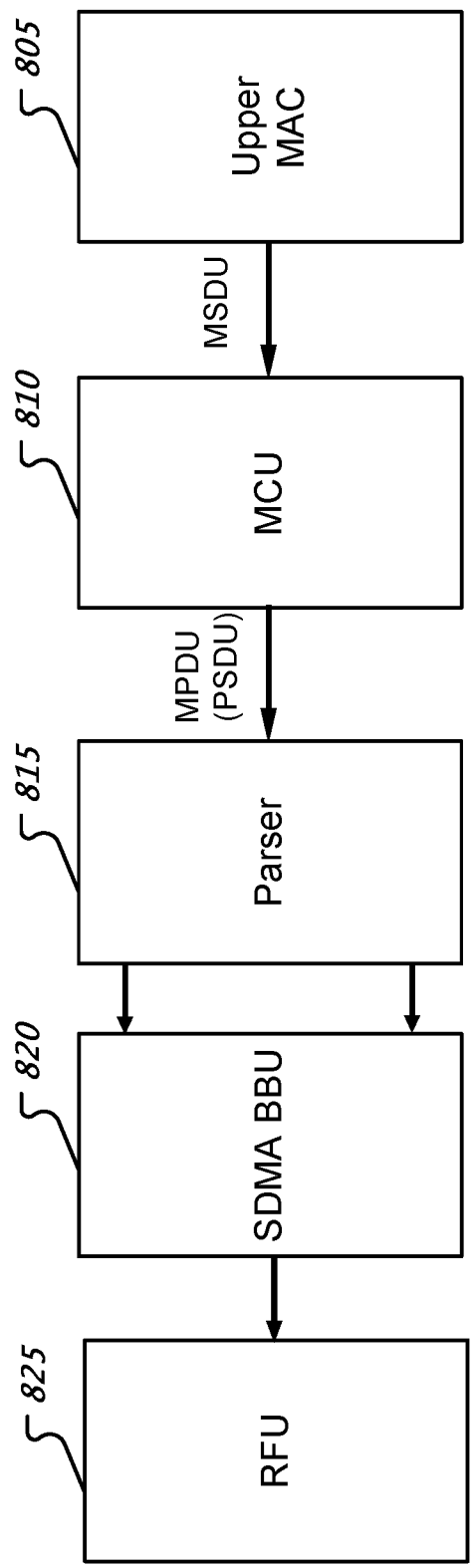
FIG. 8 shows an example of a space division data multiplexing architecture.

FIG. 8 shows an example of a space division data multiplexing architecture. In this example, a wireless communication device includes a single MCU 810 that is configured to generate data units based on information generated by an upper MAC module 805. The upper MAC module 805 can generate a MSDU based on data received from one or more higher level protocols. A MCU 810 can generate a MPDU based on a MSDU. In some implementations, a MCU 810 can output a PSDU based on a MPDU. For example, a wireless communication device can generate a data unit, e.g., a MPDU or a PSDU, that is intended for a single wireless communication device recipient. The wireless communication device can multiplex a single data unit on two or more spatial wireless channels for transmission. In some implementations, a wireless communication device can use a radio parser module 815 to parse a data unit for two or more wireless channels onto two or more radio pathways that are associated with different SDMA channels.

The wireless communication device can include a radio unit that includes a SDMA BBU 820 and a RFU 825. The SDMA BBU 820 can receive data for multiple spatial wireless channels from the parser module 815. The SDMA BBU 820 can generate transmission signals. A RFU 825, in communication with the SDMA BBU 820, can transmit the transmission signals to a receiver. The receiver can include two or more radio units coupled with two or more antenna arrays. The receiver can use a first antenna array to receive data on a first wireless channel and can use a second antenna array to receive data on a second wireless channel.

The SDMA BBU 820 can use a transmission signal model to generate SDMA transmission signals based on two or more multiplexing matrixes. The wireless communication device can construct a multiplexing matrix W for a radio unit of a receiver based on interference avoidance and/or signal-to-interference and noise ratio (SINR) balancing. Interference avoidance attempts to minimize the amount of non-desired signal energy arriving at a receiver. Interference avoidance can ensure that signals intended for a particular radio unit of a receiver arrive only at that particular radio unit and cancel out at a different radio unit of the receiver. Here, the receiver has antenna arrays for the radio units in separate physical locations to achieve SDMA.

A wireless communication device can perform SINR balancing. SINR balancing can include determining multiplexing matrices to actively control the SINRs observed at the radio units of a wireless communication device. For example, one SINR balancing approach can include maximizing the minimum SINR across serviced radio units.

In some implementations, a SDMA BBU 820 uses an OFDM transmission signal model based on $$s = \sum_{i=1}^{N} W_i x_i$$

where s is a transmitted signal vector for one tone, N is a number of simultaneously serviced radio units, $x_i$ is an information vector ($T_i \times 1$, $T_i < P_i$) intended for the i-th radio unit of the receiver, $W_i$ is a multiplexing matrix ($M \times T_i$) for the i-th radio unit, M is a number of transmit antennas of the transmitter, and $P_i$ is the number of receive antennas associated with the i-th radio unit.

A transmitter can determine the multiplexing matrix W for each of the receiver's radio units based on channel conditions between the transmitter and the radio units. The transmitter and the receiver can perform sounding for each of the receiver's radio units. Various examples of sounding techniques include explicit sounding and implicit sounding. In some cases, each radio unit of the receiver can be treated as a separate client.

In some implementations, a transmitter can determine multiple channel conditions matrices $H_k^i$, where $H_k^i$ represents the channel conditions for the k-th tone of the i-th radio unit. The first tone received by the first radio unit can be expressed as $H_1^{\ 1}[W_1^{\ 1}s_1 + W_1^{\ 2}s_2 + \ldots + W_1^{\ N}s_S]$. The multiplexing matrix W can be selected to cause the first radio unit to receive $H_1^{\ 1}W_1^{\ 1}s_1$ and to have the remaining signals $s_2$, $s_3, \ldots, s_S$ be in a null space for the first radio unit. Therefore, when using a signal interference approach, the values of the multiplexing matrix W are selected such that $H_1^{\ 1}W_1^{\ 2} \approx 0, \ldots, H_1^{\ 1}W_1^{\ N} \approx 0$. In other words, the multiplexing matrix W can adjust phases and amplitudes for these OFDM tones such that a null is created at the first radio unit. That way, the first radio unit can receive the intended signal $s_1$ without interference from other signals $s_2, s_3, \ldots, s_S$ intended for the other radio units.

Figure 9:
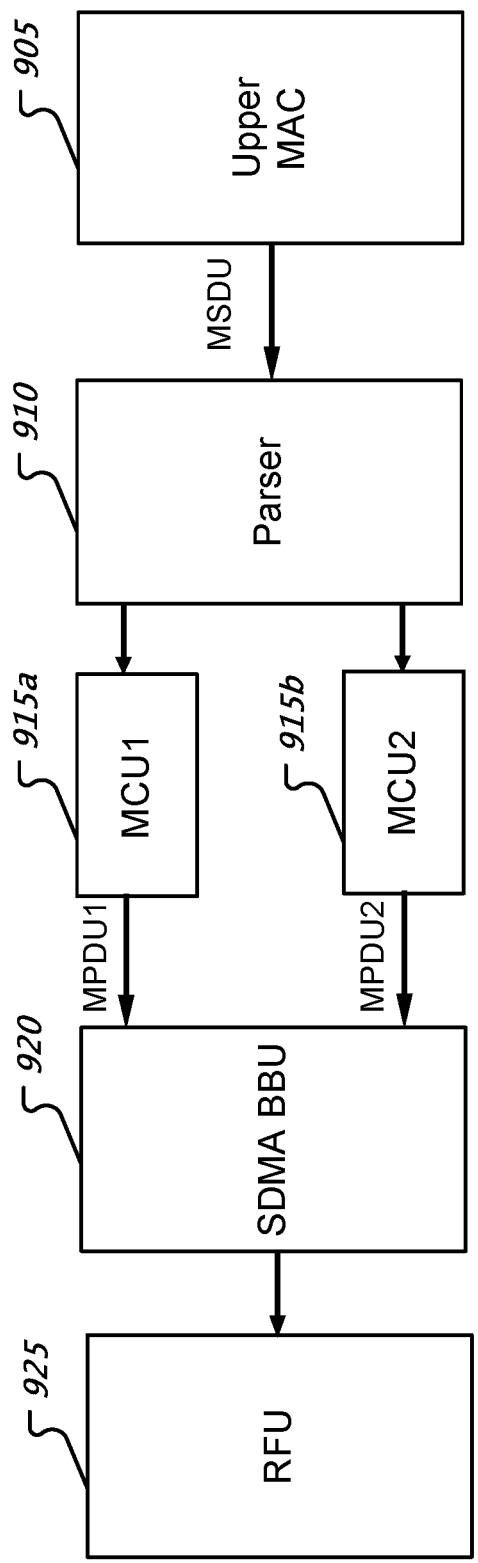
FIG. 9 shows an example of a dual medium access controller space division data multiplexing architecture.

FIG. 9 shows an example of a dual medium access controller space division data multiplexing architecture. A wireless communication device can include two or more MCUs 915a, 915b to generate a dual-radio packet that includes two or more MPDUs. For example, a wireless communication device can generate and transmit a dual-radio packet that includes a first MPDU transmitted on a first wireless channel and a second MPDU transmitted on a second wireless channel.

A wireless communication device can include an Upper MAC module 905 to generate a MSDU. The wireless communication device can multiplex a data unit such as a MSDU on two or more radio pathways. For example, a parser module 910 can parse a MSDU on to two or more radio pathways. Each radio pathway can generate different MPDUs based on different respective portions of the MSDU. In some implementations, a radio pathway can include a MCU 915a, 915b to generate a MPDU based on a portion of the MSDU. The wireless communication device can include a radio unit that includes a SDMA BBU 920 and a RFU 925. In some implementations, a SDMA BBU 920 can receive data for multiple spatial wireless channels from different MCUs 915a, 915b to generate transmission signals for the RFU 925.

A wireless communication device can support both single-radio and dual-radio communications. For example, a dual-radio wireless communication device based on IEEE 802.11n can support legacy mode communications with a single-radio wireless communication device. For example, a transmitter can transmit signaling information that causes legacy devices to ignore processing a multi-radio data packet and to prevent a legacy device from transmitting during a transmission of a multi-radio data packet.

A wireless communication device can generate and transmit signaling information that indicates that a data packet is a dual-radio data packet. Such signaling information can cause a receiver to combine information resolved from the concurrent transmissions associated with a dual-radio data packet. In some implementations, a dual-radio packet can include two or more PHY frames based on IEEE 802.11n. A wireless communication device can transmit these two or more PHY frames over two or more wireless channels to a receiver. In some implementations, the PHY frame durations are not required to be identical. In some implementations, a receiver sets a Clear Channel Assessment (CCA) duration based on the longer PHY frame duration in a dual-radio packet.

Figure 10:
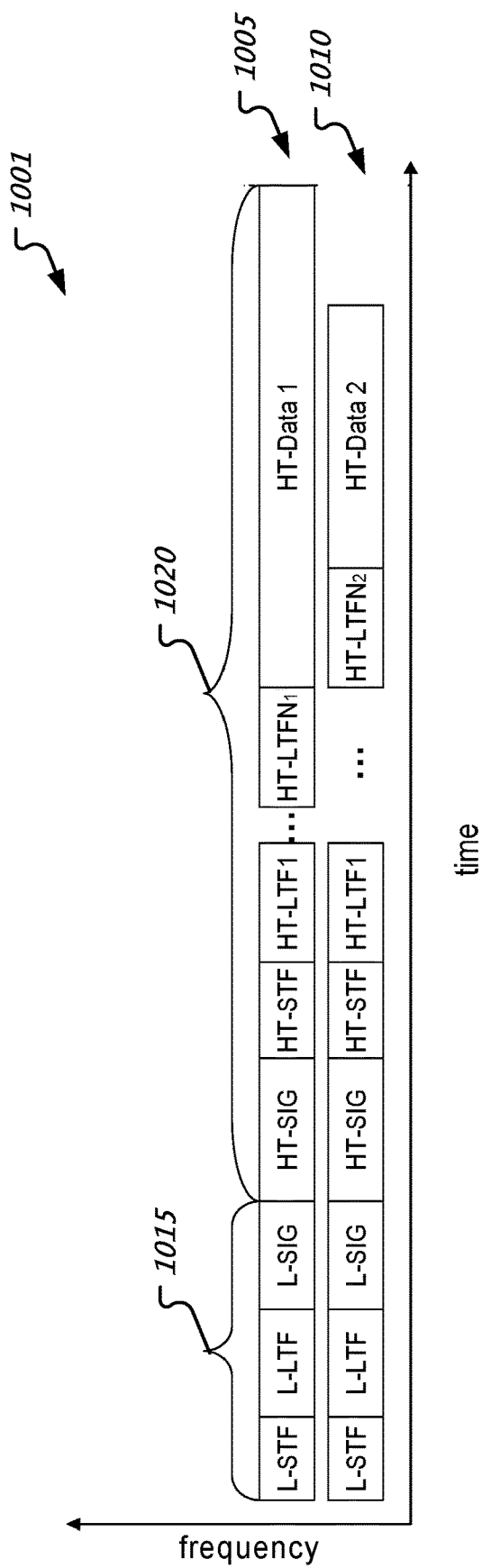
FIG. 10 shows an example of a dual-radio packet format.

FIG. 10 shows an example of a dual-radio packet format. A wireless communication device can generate a dual-radio packet 1001 based on an IEEE 802.11n Mixed-Mode. A dual-radio packet 1001 can include first and second PHY frames 1005, 1010. A first segment 1015 of the PHY frames includes Legacy Short Training Field (L-STF), Legacy Long Training Field (L-LTF), and Legacy Signal Field (L-SIG). A second segment 1020 of the PHY frames can include multiple High Throughput (HT) fields such as a HT Signal Field (HT-SIG), HT Short Training Field (HT-STF), HT Long Training Field (HT-LTF), and HT Data Field (HT-Data). In some implementations, a wireless communication device transmits the PHY frames 1005, 1010 using different radio units that are operated at different frequency bands. In some implementations, a wireless communication device transmits the PHY frames 1005, 1010 using different SDMA channels.

In some implementations, a wireless communication device can set a bit in a HT-SIG field to indicate a presence of a dual-radio packet to a receiver. In some implementations, a wireless communication device can set an IEEE 802.11n reserved bit in an L-SIG field of the PHY frames 1005, 1010 to 1 to indicate a presence of a dual-radio packet to a receiver. In some implementations, the wireless communication device can include length and rate data in the L-SIG field of the PHY frames 1005, 1010. The length and rate data can be based on the second segment 1020 of the dual-radio packet 1001. In some implementations, a receiver of a dual-band packet can set a CCA duration based on a computation using length and rate subfields in an L-SIG field of a PHY frame.

Figure 11:
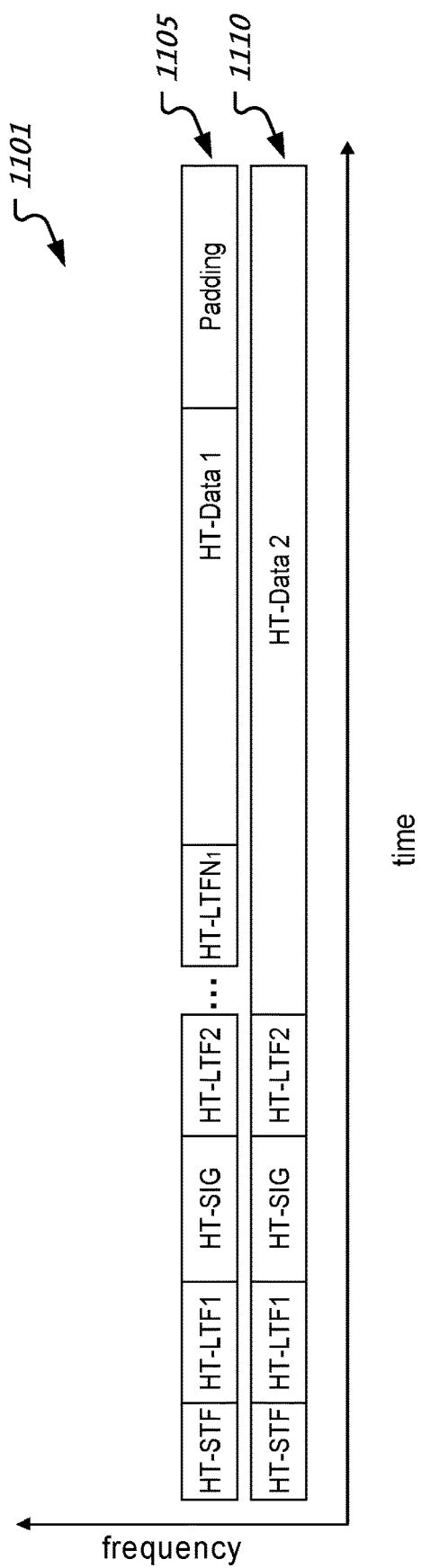
FIG. 11 shows another example of a dual-radio packet format.

FIG. 11 shows another example of a dual-radio packet format. A wireless communication device can generate a dual-radio packet 1101 based on an IEEE 802.11n Greenfield Mode. A dual-radio packet 1101 can include first and second PHY frames 1105, 1110. The PHY frames 1105, 1110 can include HT-STF, HT-LTF, HT-SIG, HT-Data fields. In some implementations, a wireless communication device can set a bit in a HT-SIG field to indicate a presence of a dual-radio packet to a receiver. A wireless communication device can include padding, if required, to generate equal duration PHY frames 1105, 1110. For example, a device can include zero-byte padding after the end of a HT-Data field to generate a PHY frame that is equal in length to another PHY frame, of a dual-radio packet, that includes a longer HT-Data field.

These dual radio techniques can be compatible with various packet formats defined for various corresponding wireless systems such as IEEE 802.11ac or IEEE 802.11af. Various wireless systems can be adapted with the techniques described herein to include signaling of a dual frequency band or a dual SDMA subspace embedded in a packet's preamble, e.g., embedded in one or more SIG fields of a packet's preamble.

In some implementations, a wireless communication device transmits the PHY frames 1105, 1110 using different radio units that are operated at different frequency bands. In some implementations, a wireless communication device transmits the PHY frames 1105, 1110 using different SDMA channels.

In some implementations, dual-radio devices are operated to be compatible with legacy devices such as legacy IEEE 802.11n based devices or legacy IEEE 802.11a based devices. In some implementations, a dual-radio packet format is compatible with such legacy devices. For example, a legacy device can detect and/or disregard a dual-radio packet transmitted in the legacy device's operating frequency band. In some implementations, dual-radio devices can create a protected time period (TxOP) during which dual-radio packet transmissions are conducted by two dual-radio packet compatible devices. Such dual-radio devices can use a MAC mechanism to reserve time for transmission of dual-radio packets.

One or more acknowledgement (ACK) packets can be transmitted by a receiving wireless communication device during a TxOP. In some cases, a negative ACK (NAK) can be transmitted to indicate a failure. If an ACK is required for a dual-radio packet, the receiving device can send the ACK after a short inter-frame space (SIFS) after the end of a dual-radio packet. Based on receiving a dual-radio packet, a wireless communication device can operate two radios to send two ACKs in the form of a dual-radio acknowledgement packet. In some implementations, a wireless communication device separately determines acknowledgements for the different PHY frames of a dual-radio packet. Therefore, it is possible that one radio unit sends an ACK, and the other radio unit sends a NAK. In some implementations, a wireless communication device operates a single radio unit to send one ACK for PHY frames received via two radios. In some implementations, a wireless communication device aggregates acknowledgement information and transmits a block ACK based on a pre-determined number of dual-radio packets.

Based on receiving a SDMA dual-radio packet, a dual-radio receiver can send one or more acknowledgements. In some implementations, if successfully received, a dual-radio receiver can operate one radio unit to send an ACK for multiple PHY frames of a SDMA dual-radio packet. In some implementations, if successfully received, a dual-radio receiver can operate a first radio unit to send an ACK for a first received PHY frame in a first time slot for acknowledgment after the dual-radio packet and operate a second radio unit to send an ACK for a second received PHY frame in a second time slot.

In some implementations, a wireless communication device can indicate an ordering of content within the PHY frames of a dual-radio packet based on setting only one of two PHY frames to indicate a dual-radio packet. For example, the PHY frame that does not indicate a dual-radio packet can be associated with a first portion of a MPDU and the PHY frame that does indicate a dual-radio packet can be associated with a second, different portion of a MPDU.

A wireless communication device can use OFDM symbols in a HT-SIG field to signal dual-radio packet information. In some implementations, a wireless communication device can use a third HT-SIG OFDM symbol to signal additional PHY information based on IEEE 802.11ac. For example, a wireless communication device can perform a 90-degree phase shift on the constellation symbols associated with the tones of the third HT-SIG OFDM symbol from the first two HT-SIG symbols, to realize auto-detection of an IEEE 802.11ac packet. In some implementations, wireless communication devices can combine PHY and MAC signaling.

In some implementations, a wireless communication device can use un-equal error protection (UEP) for data transmission to a dual-radio receiver. In some implementations, data such as video data can be divided into a group of most significant bits and a group of least significant bits. The most significant bit group can be transmitted over a first wireless channel to a dual-radio receiver using a lower data rate to achieve higher reliability. The least significant bit group can be transmitted over a second wireless channel to the dual-radio receiver using a higher data rate.

Figure 12:
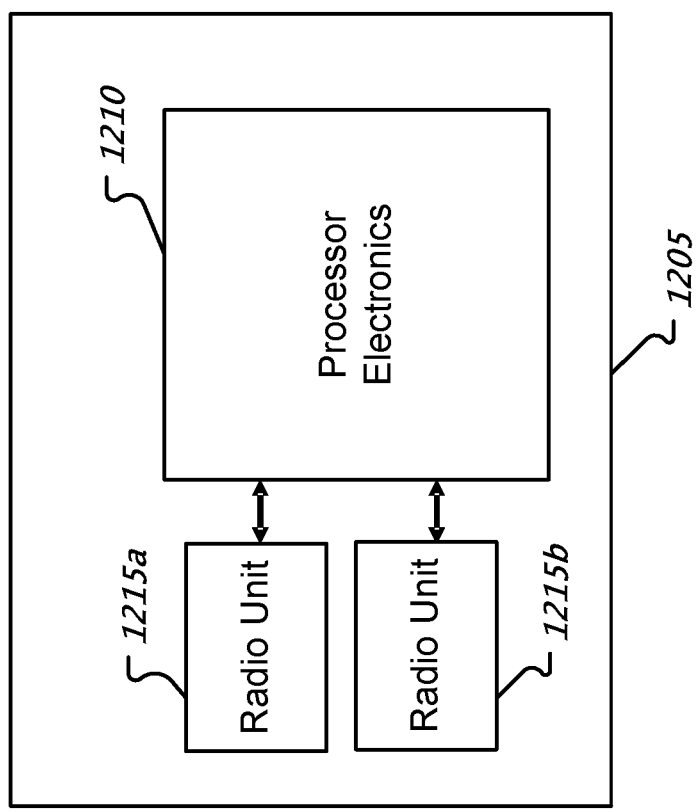
FIG. 12 shows an example a dual-radio wireless communication device.

FIG. 12 shows an example a dual-radio wireless communication device. A dual-radio wireless communication device 1205 includes processor electronics 1210 in communication with two or more radio units 1215a, 1215b. Processor electronics 1210 can include one or more processors. In some implementations, processor electronics 1210 includes specialized logic to perform one or more specific functions.

The processor electronics 1210 can operate the radio unit 1215a, 1215b to transmit and receive communication signals. Radio unit 1215a, 1215b can concurrently receive different physical layer frames of a data packet. For example, a first radio unit 1215a can receive communication signals that include one or more signals indicative of a first physical layer frame of a data packet. The first radio unit 1215a can produce a first output based on the first physical layer frame. A second radio unit 1215b can receive communication signals that include one or more signals indicative of a second physical layer frame of the data packet. The second radio unit 1215b can produce a second output based on the second physical layer frame. Processor electronics 1210 can combine information based on the first and second outputs of the radio units 1215a, 1215b to resolve the data packet.

Figure 13A:
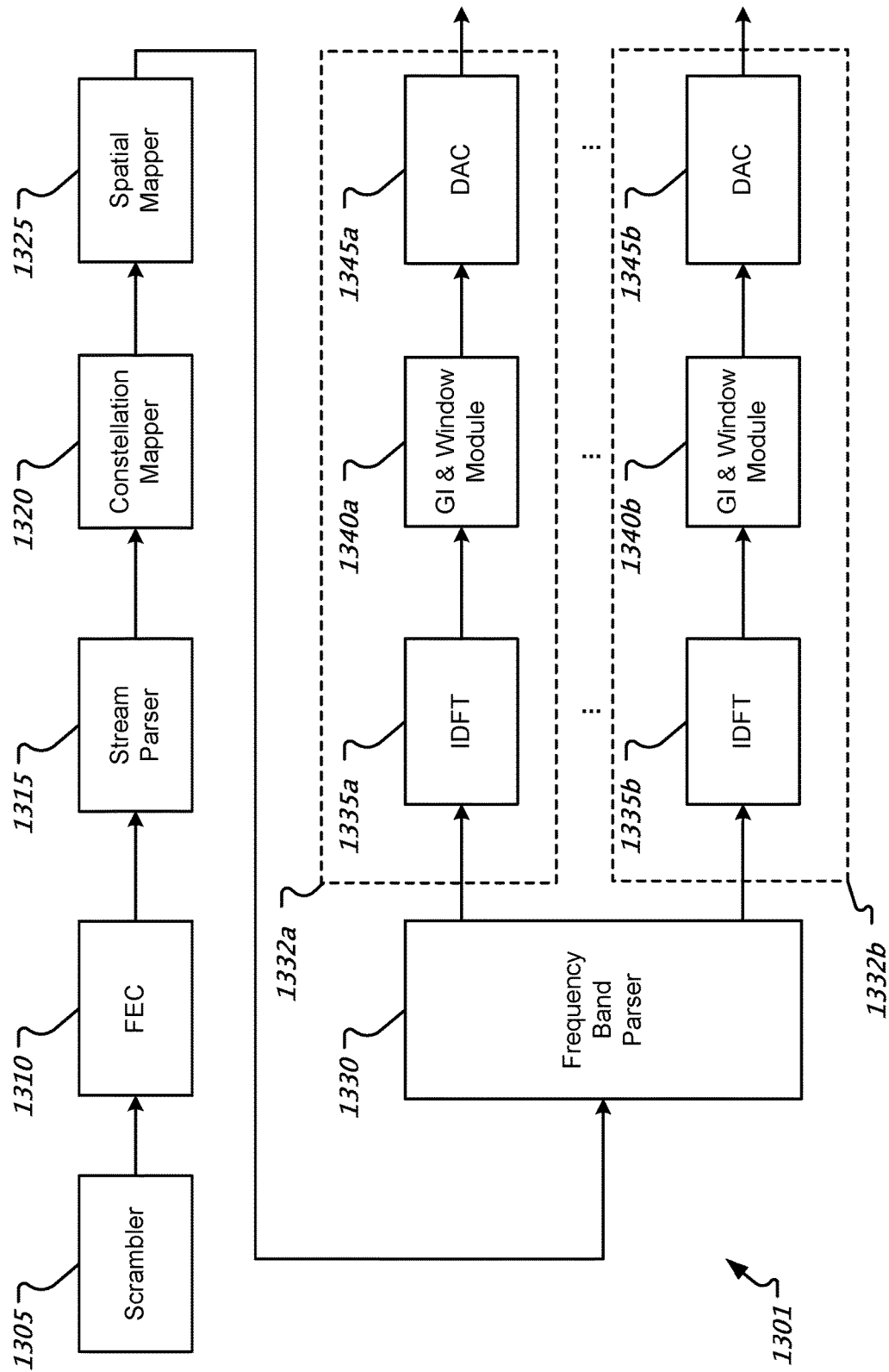
FIG. 13A shows an example of a multi-radio architecture.

FIG. 13A shows an example of a multi-radio architecture 1301. The architecture 1301 includes a scrambler 1305, forward error correction (FEC) module 1310, stream parser 1315, constellation mapper 1320, spatial mapper 1325, a multiplexer such as a frequency band parser 1330, and two or more radio pathways 1332a-b. The pathways 1332a-b include inverse discrete Fourier transform (IDFT) modules 1335a-b, guard interval (GI) and window modules 1340a-b, and DACs 1345a-b. The architecture 1301 transforms an incoming data stream into a data packet. The incoming data stream can be generated by a MAC module (not shown). Each of the pathways 1332a-b are configured to produce different portions of the data packet. The outputs of the pathways 1332a-b include separate time domain signals that will be transmitted concurrently. The IDFT modules 1335a-b can be configured to transform a vector of frequency domain values into a vector of time domain values using an inverse Fourier transformation. The length of the vector of frequency domain values is based on the number of OFDM subcarriers assigned to a pathway 1332a-b. The pathways 1332a-b are associated with different frequency bands. In some implementations, the architecture 1301 can include circuitry to modulate outputs of the pathways 1332a-b using different carrier frequencies, that correspond to different frequency bands. For example, each of the pathways 1332a-b can include a modulator, after respective DACs 1345a-b, to up-convert a baseband time domain signal into a predetermined frequency band using a carrier frequency based oscillator signal. The architecture 1301 can be configured to encode an incoming data stream across the frequency bands. In some implementations, the frequency bands include at least two non-adjacent frequency bands.

In some implementations, the stream parser 1315 can parse an incoming data stream into $N_{sts}$ number of spatial streams for transmission over two or more spatial wireless channels. In some implementations, the spatial mapper 1325 transforms $N_{sts}$ number of streams into $N_{tx}$ number of transmission paths, where $N_{tx}$ is the number of transmission antennas. For example, two spatial streams can be mapped to two or more transmission paths. In another example, a single spatial stream can be mapped two or more transmission paths. In some implementations, the spatial mapper 1325 is configured to use a spatial mapping matrix Q that maps $N_{sts}$ number of spatial streams into $N_{tx}$ number of transmission paths, where Q is of dimension $N_{tx}$-by-$N_{sts}$. The architecture 1301 can be configured to encode an incoming data stream across two or more spatial streams. In some implementations, the spatial mapper 1325 can be located after the frequency band parser 1330 such that each of the radio pathways 1332a-b performs separate spatial mappings.

Figure 13B:
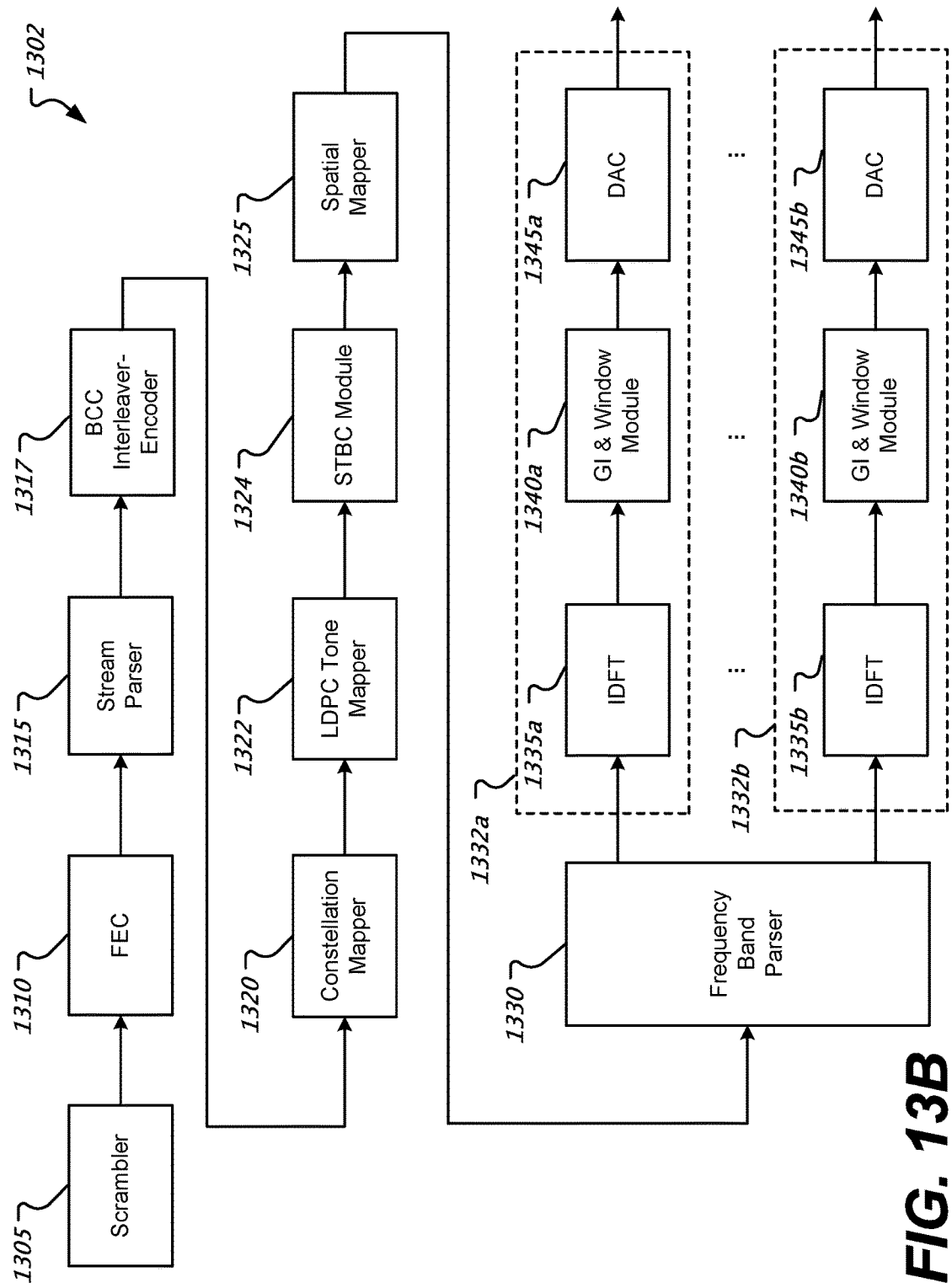
FIG. 13B shows another example of a multi-radio architecture.

FIG. 13B shows another example of a multi-radio architecture 1302. The architecture 1302 of FIG. 13B includes the architecture of FIG. 13A plus additional elements. For example, architecture 1302 includes a binary convolutional code (BCC) interleaver-encoder 1317 coupled between the stream parser 1315 and the constellation mapper 1320. The interleaver-encoder 1317 can be configured to interleave and encode data among one or more spatial streams based on a BCC. Further, different portions of a data packet produced by the radio pathways 1332a-b can be jointly protected by the BCC. In some implementations, in a corrupted received version of such a data packet, information from one or multiple portions of the data packet can be used to recover the data packet or to at least detect the corruption. Moreover, architecture 1302 includes a low-density parity-check (LDPC) tone mapper 1322 and a space-time block code (STBC) encoder 1324 coupled between the constellation mapper 1320 and the spatial mapper 1325. The STBC encoder 1324 can be configured to encode input data over space and time, e.g., different versions of the data are transmitted over different antennas and timeslots.

Figure 14:
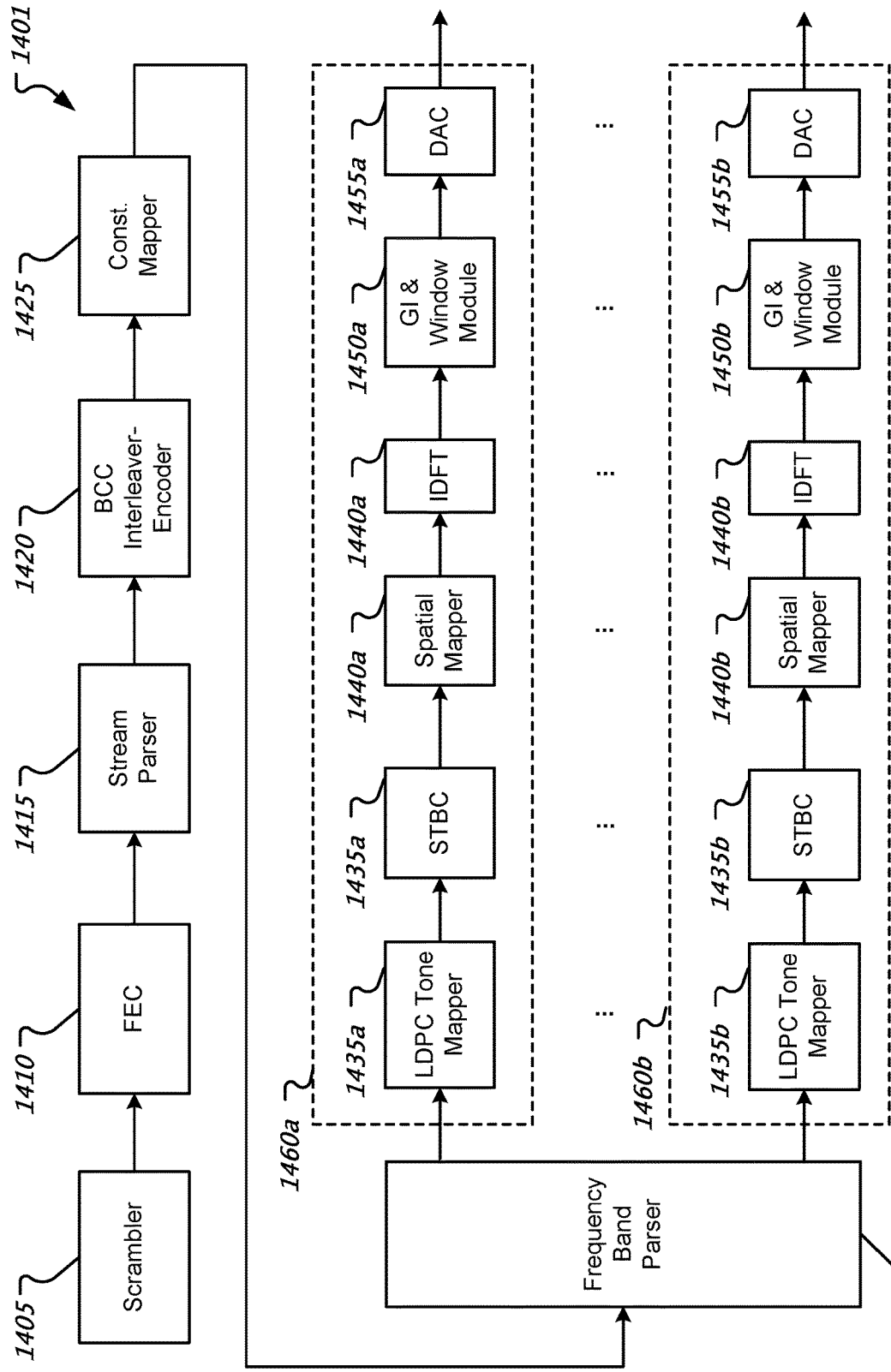
FIG. 14 shows another example of a multi-radio architecture.

FIG. 14 shows another example of a multi-radio architecture 1401. The architecture 1401 includes a scrambler 1405, FEC module 1410, stream parser 1415, BCC interleaver-encoder 1420, constellation mapper 1425, a multiplexer such as a frequency band parser 1430, and two or more radio pathways 1432a-b. The radio pathways 1460a-b include a LDPC tone mapper 1435a-b, STBC encoder 1435a-b, spatial mapper 1440a-b, IDFT module 1440a-b, GI and window module 1450a-b, and DAC 1455a-b.

Figure 15:
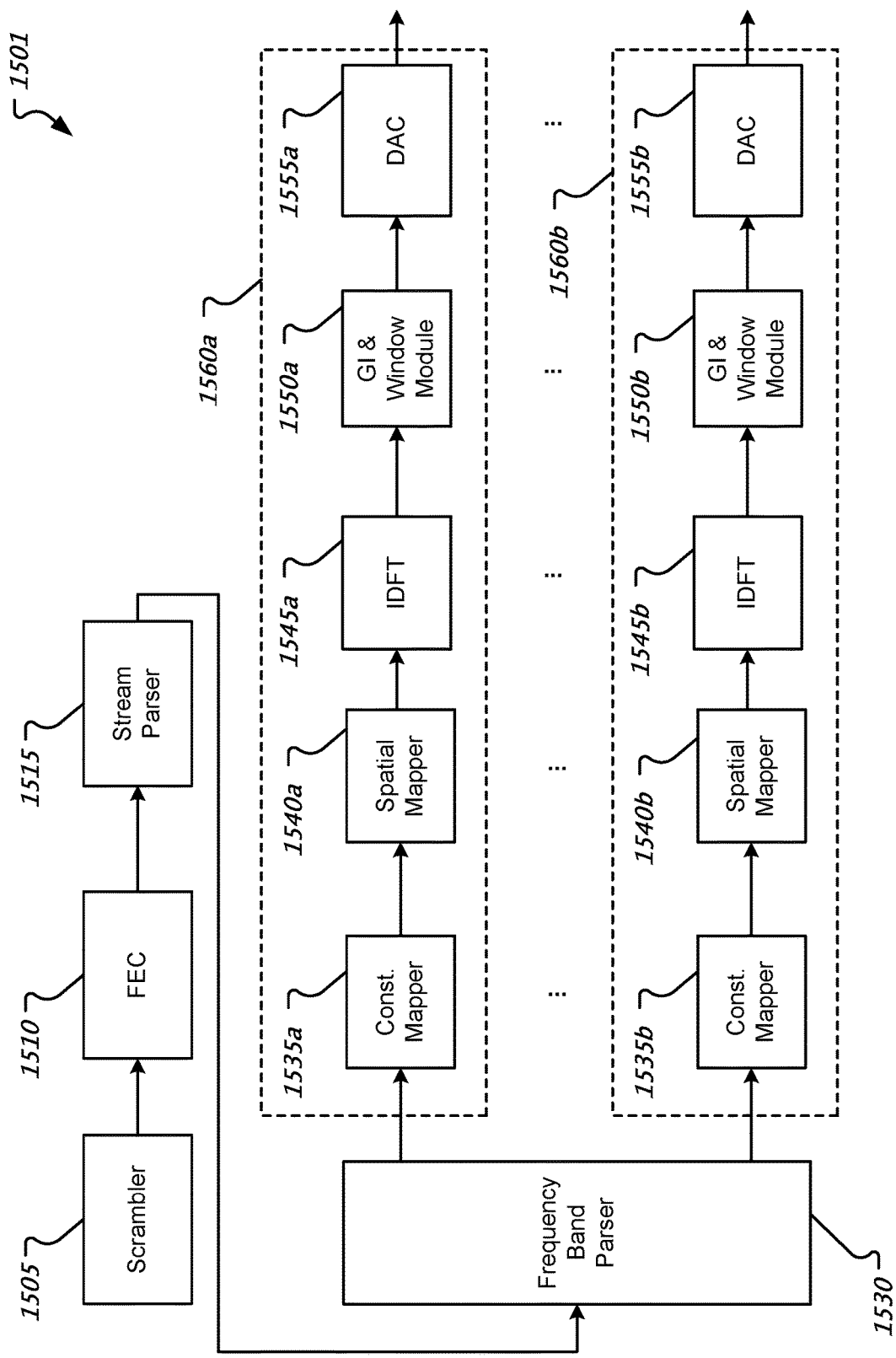
FIG. 15 shows yet another example of a multi-radio architecture.

FIG. 15 shows yet another example of a multi-radio architecture 1501. The architecture 1501 includes a scrambler 1505, FEC module 1510, stream parser 1515, a multiplexer such as a frequency band parser 1530, and two or more radio pathways 1560a-b. The scrambler 1505 can be configured to scramble an incoming data stream. The FEC module 1510 can be configured to forward error encode an output of the scrambler 1505. The stream parser 1515 can be configured to produce one or more spatial streams based on an output from the FEC module 1510. The frequency band parser 1530 can be configured to multiplex bits from the stream parser 1515 onto the pathways 1560a-b for each of the one or more spatial streams provided by the stream parser 1515. The pathways 1560a-b include a constellation mapper 1535a-b, spatial mapper 1540a-b, IDFT module 1545a-b, GI and window module 1550a-b, and DAC 1555a-b. In some implementations, a BCC interleaver is coupled between the stream parser 1515 and the frequency band parser 1530. In some implementations, a LDPC tone mapper and STBC encoder are coupled between the constellation mapper 1535a-b and the spatial mapper 1540a-b in each pathway 1560a-b.

Figure 16A:
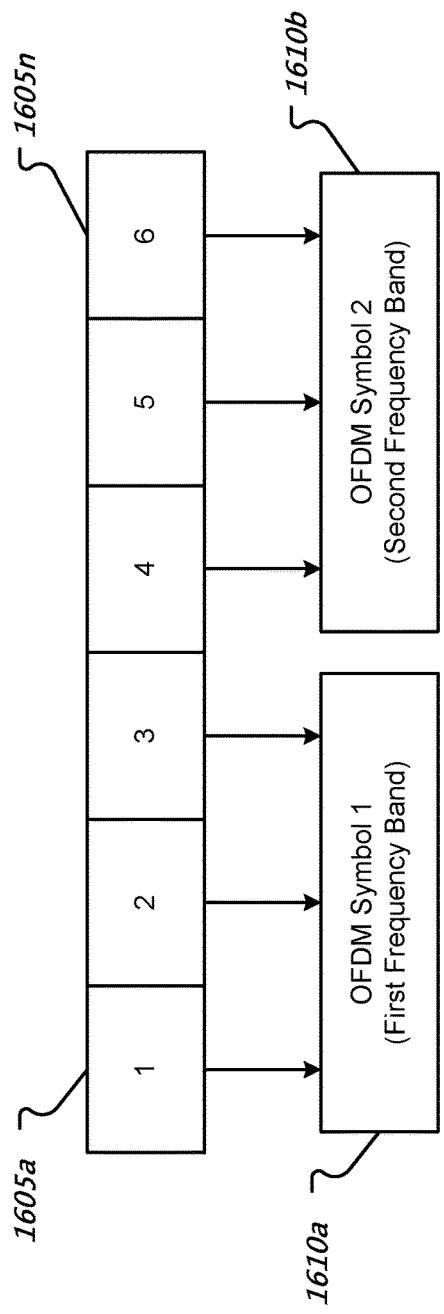
FIG. 16A shows an example of an element distribution associated with a block-wise multiplexing technique.

FIG. 16A shows an example of an element distribution associated with a block-wise multiplexing technique. A group of elements 1605a-n of a data stream is block-wise parsed for inclusion into first and second OFDM symbols 1610a-b that will be concurrently transmitted within different frequency bands. Thus, each block 1610a-b holds a contiguous grouping of elements 1605a-n from the data stream. In some implementations, elements 1605a-n are bits. In some implementations, elements 1605a-n are constellation symbols. Each of the OFDM symbols 1610a-b includes multiple OFDM subcarriers.

Figure 16B:
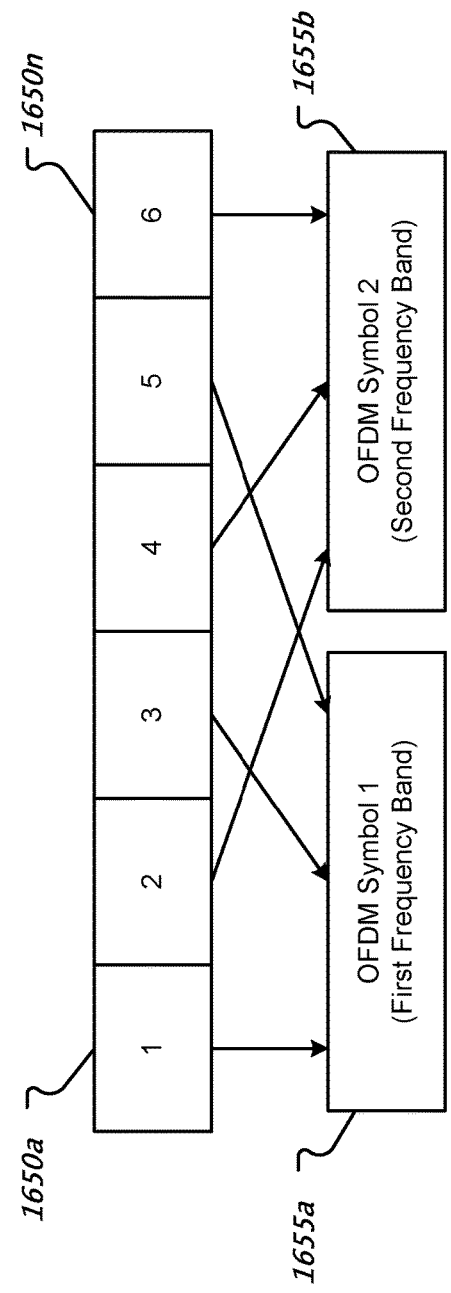
FIG. 16B shows an example of an element distribution associated with a round-robin multiplexing technique.

FIG. 16B shows an example of an element distribution associated with a round-robin multiplexing technique. Using a round-robin technique, a group of elements 1650a-n of a data stream is element-wise parsed for inclusion into first and second OFDM symbols 1655a-b that will be concurrently transmitted within different frequency bands. Thus, each block 1655a-b holds a different and interleaved portion of elements 1650a-n from the data stream. As depicted, the distributed elements for each symbol 1655a-b are non-contiguous with respect to their original placement within the data stream. In some implementations, elements 1650a-n are bits. In some implementations, elements 1650a-n are subgroups of bits. The size of a subgroup of bits can be based on an alphabet size of a constellation mapper. In some implementations, elements 1650a-n are constellation symbols. Each of the OFDM symbols 1655a-b includes multiple OFDM subcarriers.

Figure 17:
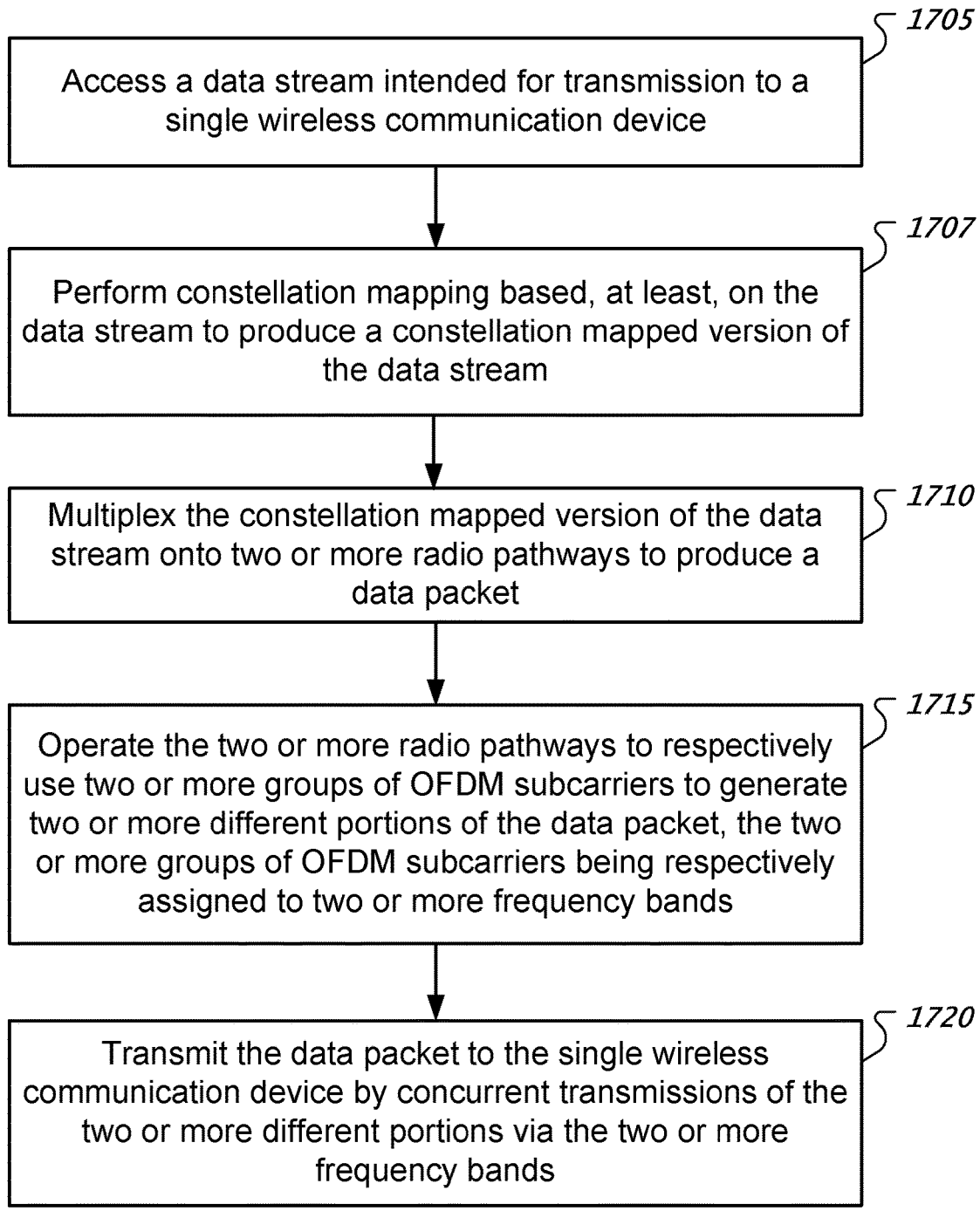
FIG. 17 shows a flowchart of an example of a process associated with a multi-radio device.

FIG. 17 shows a flowchart of an example of a process associated with a multi-radio device. At 1705, the process includes accessing a data stream intended for transmission to a single wireless communication device. In some implementations, the data stream is based on an output of a stream parser. In some implementations, the stream parser can generate two or more spatial streams. In some implementations, the data stream is based on an output of a BCC interleaver-encoder and a stream parser. For example, the BCC interleaver-encoder can be configured to perform BCC encoding and interleaving among two or more spatial streams produced by a stream parser.

At 1707, the process includes performing constellation mapping based, at least, on the data stream to produce a constellation mapped version of the data stream. At 1710, the process includes multiplexing the constellation mapped version of the data stream onto two or more radio pathways to produce a data packet. Each radio pathway can include a radio unit. In some implementations, the process includes performing spatial mapping based, at least, on the constellation mapped version of the data stream to produce a spatial version of the data stream. In some implementations, multiplexing the constellation mapped version of the data stream onto the two or more radio pathways, at 1710, can include multiplexing the spatial version of the data stream onto the two or more radio pathways.

At 1715, the process includes operating the two or more radio pathways to respectively use two or more groups of OFDM subcarriers to generate two or more different portions of the data packet. The two or more groups of OFDM subcarriers are respectively assigned to two or more frequency bands. At 1720, the process includes transmitting the data packet to the single wireless communication device by concurrent transmissions of the two or more different portions via the two or more frequency bands.

In some implementations, multiplexing the constellation mapped version of the data stream onto the two or more radio pathways, at 1710, can include alternating among the two or more radio pathways to distribute constellation symbols of the constellation mapped version of the data stream such that each radio pathway obtains a different interleaved portion of the constellation mapped version of the data stream. In some implementations, the process uses a spatial mapping matrix Q to map $N_{sts}$ number of spatial streams into $N_{tx}$ number of transmission paths, where Q is of dimension $N_{tx}$-by-$N_{sts}$. In some implementations, the multiplexing at 1710 can use an output produced by using a spatial mapping matrix Q. Assume, for example, that there are $N_f$ frequency bands, and $N_{tone}$ OFDM subcarriers per frequency band. For each transmission path ($N_{tx}$ in total), the process allocates N1 constellation symbols to each frequency band in a round-robin fashion. For example, N1 constellations in a first transmission path are allocated to the first transmission path of the first frequency band, then the next N1 constellations in the first transmission path are allocated to the first transmission path of the second frequency band. This continues until the last N1 constellation symbols are allocated. Then the constellation symbols in the second transmission path is allocated to $N_f$ frequency bands in the same manner. In some implementations, N1 can be selected such that it is an integer that allows $N_{tone}/N_f/N1$ to be an integer.

In some implementations, multiplexing the constellation mapped version of the data stream onto the two or more radio pathways, at 1710, can include providing a first group of contiguous constellation symbols of the constellation mapped version of the data stream to a first radio pathway of the two or more radio pathways, and providing a second group of contiguous constellation symbols of the constellation mapped version of the data stream to a second radio pathway of the two or more radio pathways. Assume, for example, that there are $N_f$ frequency bands, $N_{tone}$ OFDM subcarriers per frequency band, and that $N2=N_{tone}/N_f$. In a block-wise multiplexing scheme, for the first transmission path, N2 constellation symbols are allocated to the first transmission path of the first frequency band; then the next N2 constellation symbols are allocated to the first transmission path of the second frequency band; continue until the last N2 constellation symbols are allocated to the first transmission path of the last frequency band. The block-wise multiplexing scheme can be performed for each of $N_{tx}$ transmission paths.

Figure 18:
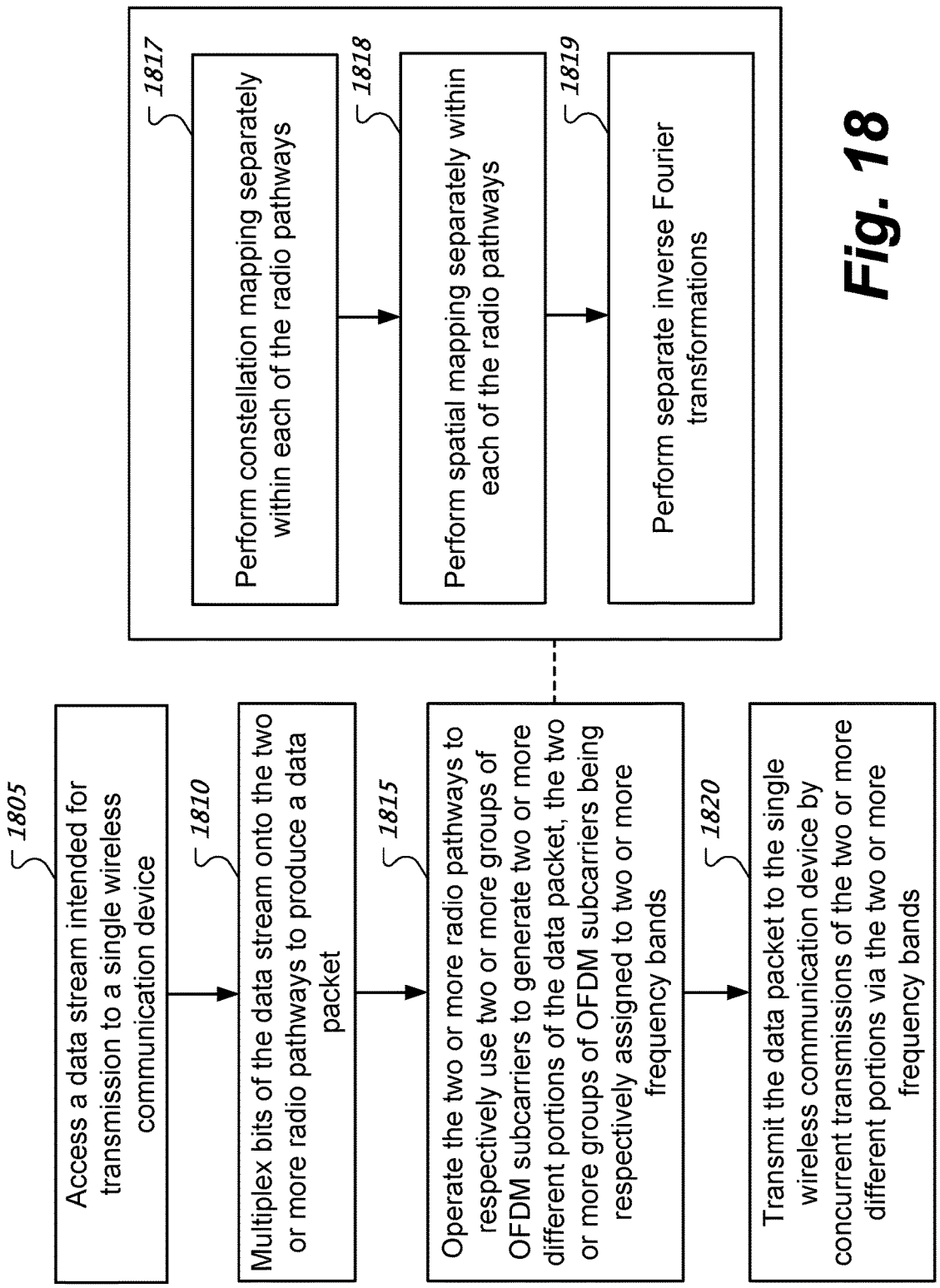
FIG. 18 shows a flowchart of another example of a process associated with a multi-radio device.

FIG. 18 shows a flowchart of another example of a process associated with a multi-radio device. At 1805, the process includes accessing a data stream intended for transmission to a single wireless communication device. At 1810, the process includes multiplexing bits of the data stream onto the two or more radio pathways to produce a data packet. In some implementations, multiplexing bits of the data stream can include apply a multiplexing technique to each of one or more spatial streams. At 1815, the process includes operating the two or more radio pathways to respectively use two or more groups of OFDM subcarriers to generate two or more different portions of the data packet. The two or more groups of OFDM subcarriers are respectively assigned to two or more frequency bands. Operating, at 1815, the two or more radio pathways can include, at 1817, performing constellation mapping separately within each of the radio pathways. Operating, at 1815, the two or more radio pathways can include, at 1818, performing spatial mapping separately within each of the radio pathways. For example, the process can apply a spatial mapping matrix Q within each of the radio pathways. Operating, at 1815, the two or more radio pathways can include, at 1819, can include performing separate inverse Fourier transformations. At 1820, the process includes transmitting the data packet to the single wireless communication device by concurrent transmissions of the two or more different portions via the two or more frequency bands.

In some implementations, multiplexing the bits of the data stream, at 1810, can include alternating among the two or more radio pathways to distribute the bits such that each radio pathway obtains a different interleaved portion of the bits. For each spatial stream, allocate N3 bits to each frequency band in a round robin fashion. For example, N3 bits in a first spatial stream is allocated to the first spatial stream of the first frequency band, then the next N3 bits in the first spatial stream is allocated to the first spatial stream of the second frequency band, continue until the last N3 bits are allocated. For the second spatial stream, allocate N3 bits in the second spatial stream to $N_f$ frequency bands in the same manner. Repeat, for any additional spatial streams. In some implementations, N3 can be selected such that it is an integer that allows $S*N_{tone}/N_f/N3$ to be an integer, e.g., N3=1, S, or 2S, where S is a number of bits represented by each constellation symbols. For example, BPSK encodes one bit per constellation symbol (S=1), QPSK encodes two bits per constellation symbol (S=2), and 64QAM encodes 6 bits per symbol (S=6).

In some implementations, multiplexing the bits of the data stream, at 1810, can include providing a first group of contiguous bits of the bits of the data stream to a first radio pathway of the two or more radio pathways; and providing a second group of contiguous bits of the bits of the data stream to a second radio pathway of the two or more radio pathways. Assume, for example, that there are $N_f$ frequency bands, $N_{tone}$ OFDM subcarriers per frequency band, and that $N4=S*N_{tone}/N_f$. For the first spatial stream, N4 bits are allocated to the first spatial stream of the first frequency band; then the next N4 bits are allocated to the first spatial stream of the second frequency band; continue until the last N4 bits of the first spatial stream are allocated to the first spatial stream of the last frequency band. Repeat, for the second spatial stream, and any remaining spatial streams.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Other embodiments fall within the scope of the following claims.

What is claimed is:

1. A method, comprising:
    accessing a data stream intended for transmission to a single wireless communication device;
    generating, in a medium access control (MAC) layer, a MAC protocol data unit (MPDU) for the single wireless communication device based on the data stream;
    generating a physical layer service data unit (PSDU) that includes the MPDU;
    multiplexing the data stream to two or more radio pathways to produce a data packet, wherein multiplexing the data stream comprises multiplexing the PSDU to the two or more radio pathways;
    generating, via the two or more radio pathways, two or more different physical layer portions of the data packet based on an aggregated capacity of two or more wireless channels that are associated with the two or more radio pathways, wherein the two or more radio pathways are respectively configured to use two or more groups of orthogonal frequency division multiplexing (OFDM) subcarriers to generate the two or more different physical layer portions of the data packet, wherein the two or more different physical layer portions of the data packet respectively comprise different portions of the MPDU;
    determining multiplexing matrices for two or more radio units of the single wireless communication device based on channel conditions; and
    transmitting the data packet to the single wireless communication device by concurrent transmissions of the two or more different physical layer portions of the data packet via the two or more wireless channels, the transmissions of the two or more different physical layer portions being based on the multiplexing matrices for the two or more radio units of the single wireless communication device,
    wherein transmitting the data packet comprises transmitting signaling information that causes a legacy device to ignore processing of the concurrent transmissions of the two or more different physical layer portions of the data packet and to prevent the legacy device from transmitting during the concurrent transmissions of the two or more different physical layer portions of the data packet.

2. The method of claim 1, wherein multiplexing the data stream comprises multiplexing a stream of bits onto the two or more radio pathways, wherein the radio pathways are configured to perform constellation mapping based on respective portions of the stream of bits.

3. The method of claim 2, wherein multiplexing the stream of bits onto the two or more radio pathways comprises alternating among the two or more radio pathways to distribute the stream of bits such that each radio pathway obtains a different interleaved portion of the stream of bits.

4. The method of claim 1, comprising:
performing constellation mapping based, at least, on the data stream to produce a constellation mapped version of the data stream, wherein multiplexing the data stream comprises multiplexing the constellation mapped version of the data stream onto the two or more radio pathways.

5. The method of claim 4, wherein multiplexing the constellation mapped version of the data stream onto the two or more radio pathways comprises alternating among the two or more radio pathways to distribute constellation symbols of the constellation mapped version of the data stream such that each radio pathway obtains a different interleaved portion of the constellation mapped version of the data stream.

6. The method of claim 1, comprising:
performing constellation mapping based, at least, on the data stream to produce a constellation mapped version of the data stream; and
performing spatial mapping based, at least, on the constellation mapped version of the data stream to produce a spatial version of the data stream, wherein multiplexing the data stream comprises multiplexing the spatial version of the data stream onto the two or more radio pathways.

7. The method of claim 1, comprising:
interleaving and encoding the data stream based on a binary convolutional code to produce a convolutional version of the data stream, wherein multiplexing the data stream comprises multiplexing the convolutional version of the data stream onto the two or more radio pathways, and wherein the different physical layer portions of the data packet are jointly protected by the binary convolutional code.

8. A system, comprising:
processor electronics configured to generate data intended for transmission to a single wireless communication device within a data packet, generate, in a medium access control (MAC) layer, a MAC protocol data unit (MPDU) for the single wireless communication device based on the data, and generate a physical layer service data unit (PSDU) that includes the MPDU;
a parser configured to multiplex the data to two or more streams;
two or more radio pathways that are configured to collectively produce the data packet based, at least, on the two or more streams, wherein the two or more radio pathways are configured to generate two or more different physical layer portions of the data packet based on an aggregated capacity of two or more wireless channels that are associated with the two or more radio pathways, wherein the two or more radio pathways are respectively configured to use two or more groups of orthogonal frequency division multiplexing (OFDM) subcarriers to generate the two or more different physical layer portions of the data packet, wherein the parser is configured to multiplex the PSDU to the two or more radio pathways, and wherein the two or more different physical layer portions of the data packet respectively comprise different portions of the MPDU; and
circuitry configured to:
determine multiplexing matrices for two or more radio units of the single wireless communication device based on channel conditions;
transmit the data packet to the single wireless communication device by concurrent transmissions of the two or more different physical layer portions via the two or more wireless channels, the transmissions of the two or more different physical layer portions being based on the multiplexing matrices for the two or more radio units of the single wireless communication device; and
transmit signaling information that causes a legacy device to ignore processing of the concurrent transmissions of the two or more different physical layer portions of the data packet and to prevent the legacy device from transmitting during the concurrent transmissions of the two or more different physical layer portions of the data packet.

9. The system of claim 8, wherein the parser is configured to multiplex bits of the data onto the two or more radio pathways, wherein the two or more radio pathways each comprise a constellation mapper configured to generate constellation symbols based on respective portions of the bits of the data.

10. The system of claim 9, wherein the parser is configured to multiplex the bits of the data by alternating among the two or more radio pathways to distribute the bits such that each radio pathway obtains a different interleaved portion of the bits.

11. The system of claim 8, comprising:
a constellation mapper configured to produce a constellation mapped version of the data, wherein the parser is configured to multiplex the constellation mapped version of the data in to the two or more streams.

12. The system of claim 11, wherein the parser is configured to alternate among the two or more radio pathways to distribute constellation symbols of the constellation mapped version of the data such that each radio pathway obtains a different interleaved portion of the constellation mapped version of the data.

13. The system of claim 8, comprising:
a constellation mapper configured to produce a constellation mapped version of the data; and
a spatial mapper configured to perform spatial mapping based, at least, on the constellation mapped version of the data to produce a spatial version of the data,
wherein the parser is configured to multiplex the spatial version of the data in to the two or more streams.

14. The system of claim 8, comprising:
circuitry configured to interleave and encode the data based on a binary convolutional code to produce a convolutional version of the data, wherein the parser is configured to multiplex the convolutional version of the data in to the two or more streams, and wherein the different physical layer portions of the data packet are jointly protected by the binary convolutional code.

15. An apparatus, comprising:
a parser configured to multiplex data, intended for transmission to a single wireless communication device within a data packet, to two or more streams; and
two or more radio units that are configured to collectively produce the data packet based, at least, on the two or more streams, wherein the two or more radio units are configured to generate two or more different portions of the data packet based on an aggregated capacity of two or more wireless channels that are associated with the two or more radio units, wherein the two or more radio units are respectively configured to use two or more groups of orthogonal frequency division multiplexing (OFDM) subcarriers to generate the two or more different portions of the data packet, and wherein the two or more radio units each include circuitry to:
 determine multiplexing matrices for two or more radio units of the single wireless communication device based on channel conditions; and
 produce two or more transmission signals for transmission over respective two or more antennas to the single wireless communication device, wherein the data packet is based, at least, on the two or more transmission signals produced from each of the two or more radio units, the two or more transmission signals being based on the multiplexing matrices for the two or more radio units of the single wireless communication device,
 wherein the two or more transmission signals comprise signaling information to cause the single wireless communication device to combine information resolved from the two or more transmission signals before transmitting an acknowledgement to the data packet.

16. The apparatus of claim 15, wherein the parser is configured to multiplex bits of the data onto the two or more radio units, wherein the two or more radio units each comprise a constellation mapper configured to generate constellation symbols based on respective portions of the bits of the data.

17. The apparatus of claim 16, wherein the parser is configured to multiplex the bits of the data by alternating among the two or more radio units to distribute the bits such that each radio unit obtains a different interleaved portion of the bits.

18. The apparatus of claim 15, comprising:
 a constellation mapper configured to produce a constellation mapped version of the data, wherein the parser is configured to multiplex the constellation mapped version of the data in to the two or more streams.

19. The apparatus of claim 15, comprising:
 a constellation mapper configured to produce a constellation mapped version of the data; and
 a spatial mapper configured to perform spatial mapping based, at least, on the constellation mapped version of the data to produce a spatial version of the data,
 wherein the parser is configured to multiplex the spatial version of the data in to the two or more streams.

20. The apparatus of claim 15, comprising:
 circuitry configured to interleave and encode the data based on a binary convolutional code to produce a convolutional version of the data, wherein the parser is configured to multiplex the convolutional version of the data in to the two or more streams, and wherein the different portions of the data packet are jointly protected by the binary convolutional code.

* * * * *